United States Patent
Fakhraie et al.

(10) Patent No.: US 12,159,175 B1
(45) Date of Patent: Dec. 3, 2024

(54) SYSTEMS AND METHODS FOR MULTI-PLATFORM PRODUCT INTEGRATION

(71) Applicant: Wells Fargo Bank, N.A., San Francisco, CA (US)

(72) Inventors: Lila Fakhraie, Belmont, CA (US); Jennifer Greene, Novato, CA (US); Christopher J. Hirth, Bell Canyon, CA (US); Ashish B. Kurani, Hillsborough, CA (US); Andrea Renee Leighton, San Francisco, CA (US); Margot Lockwood-Stein, Palo Alto, CA (US); Benjamin Soccorsy, Larkspur, CA (US); Ronald H. Yang, El Cerrito, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 177 days.

(21) Appl. No.: 17/389,099

(22) Filed: Jul. 29, 2021

Related U.S. Application Data

(62) Division of application No. 16/215,548, filed on Dec. 10, 2018, now Pat. No. 11,106,515.

(Continued)

(51) Int. Cl.
*G06F 9/54* (2006.01)
*G06Q 20/14* (2012.01)
(Continued)

(52) U.S. Cl.
CPC ............ *G06F 9/547* (2013.01); *G06Q 20/14* (2013.01); *G06Q 20/36* (2013.01); *H04L 63/08* (2013.01);
(Continued)

(58) Field of Classification Search
CPC ......... G06F 9/547; G06F 9/451; G06Q 20/14; G06Q 20/36; H04L 63/08; H04L 2463/102; H04W 12/062
See application file for complete search history.

(56) References Cited

U.S. PATENT DOCUMENTS

| 1,044,246 | A | 11/1912 | Reid |
| 6,347,306 | B1 | 2/2002 | Swart |

(Continued)

FOREIGN PATENT DOCUMENTS

| WO | WO-2010/085370 | | 7/2010 |
| WO | WO-2017/160877 | A1 | 9/2017 |
| WO | WO-2017/181185 | A1 | 10/2017 |

OTHER PUBLICATIONS

Apple, Press Release, "Apple Pay Cash and person to person payments now available," Dec. 5, 2017, available at https://www.apple.com/newsroom/2017/12/apple-pay-cash-and-person-to-person-payments-now-available/ [retrieved on Mar. 6, 2023] (Year: 2017).*

(Continued)

*Primary Examiner* — Bennett M Sigmond
*Assistant Examiner* — Bolko M Hamerski
(74) *Attorney, Agent, or Firm* — Foley & Lardner LLP

(57) ABSTRACT

A computing system includes a network circuit configured to communicate data over a network, an accounts database configured to store information pertaining to accounts associated with a plurality of customers, and a plurality of application programming interfaces (APIs). The computing system also includes an integration circuit configured to receive a plurality of indications from different third parties of third party preferences to integrate different ones of the functionalities into different third party services. The integration circuit is further configured to select different subsets of the plurality of APIs for the different third parties based on functionalities identified via the indications. The integra- (Continued)

tion circuit is further configured to provide, via a first selected subset of the plurality of APIs, information associated with a first functionality to an external device to facilitate access to the first functionality via a first third party service.

20 Claims, 9 Drawing Sheets

Related U.S. Application Data

(60) Provisional application No. 62/611,288, filed on Dec. 28, 2017.

(51) Int. Cl.
    *G06Q 20/36*     (2012.01)
    *H04L 9/40*     (2022.01)
    *H04W 12/062*     (2021.01)

(52) U.S. Cl.
    CPC ..... *H04W 12/062* (2021.01); *H04L 2463/102* (2013.01)

(56) References Cited

U.S. PATENT DOCUMENTS

| | | | |
|---|---|---|---|
| 6,721,776 B1 | 4/2004 | Erickson et al. | |
| 6,957,199 B1 | 10/2005 | Fisher | |
| 7,249,097 B2 | 7/2007 | Hutchison et al. | |
| 7,356,506 B2 | 4/2008 | Watson et al. | |
| 7,444,676 B1 | 10/2008 | Asghari-Kamrani et al. | |
| 7,523,068 B2 | 4/2009 | Britney et al. | |
| 7,536,326 B2 | 5/2009 | Tyson-Quah | |
| 7,610,233 B1 * | 10/2009 | Leong | G06Q 10/087 705/28 |
| 7,725,875 B2 | 5/2010 | Waldrep | |
| 7,729,994 B2 | 6/2010 | Gupta et al. | |
| 7,831,521 B1 | 11/2010 | Ball et al. | |
| 7,870,078 B2 | 1/2011 | Clark et al. | |
| 7,890,393 B2 | 2/2011 | Talbert et al. | |
| 8,301,500 B2 | 10/2012 | Pharris | |
| 8,352,323 B2 | 1/2013 | Fisher | |
| 8,352,370 B1 | 1/2013 | White et al. | |
| 8,412,625 B2 | 4/2013 | Pilo' | |
| 8,423,456 B2 | 4/2013 | Egnatios et al. | |
| 8,447,630 B2 | 5/2013 | O'Brien et al. | |
| 8,452,708 B1 | 5/2013 | Birenbaum et al. | |
| 8,453,925 B2 | 6/2013 | Fisher et al. | |
| 8,527,408 B2 | 9/2013 | Campbell et al. | |
| 8,606,670 B2 | 12/2013 | Patton | |
| 8,745,194 B2 | 6/2014 | Uribe-Etxebarria Jimenez | |
| 8,818,870 B2 | 8/2014 | Fisher | |
| 8,838,503 B2 | 9/2014 | Pelegero | |
| 9,135,618 B1 | 9/2015 | Dorsey et al. | |
| 9,219,736 B1 | 12/2015 | Lewis et al. | |
| 9,225,707 B1 | 12/2015 | De Sousa et al. | |
| 9,235,839 B2 | 1/2016 | Dua | |
| 9,378,356 B2 | 6/2016 | Rockwell | |
| 9,471,913 B1 | 10/2016 | Kaptcan et al. | |
| 9,479,491 B1 | 10/2016 | Farnsworth et al. | |
| 9,495,699 B2 | 11/2016 | Mangaru et al. | |
| 9,525,690 B2 * | 12/2016 | Burgess | H04L 63/10 |
| 9,542,673 B2 | 1/2017 | Tanner et al. | |
| 9,589,268 B2 * | 3/2017 | Hammad | H04L 63/06 |
| 9,633,341 B2 | 4/2017 | Kim et al. | |
| 9,646,297 B2 | 5/2017 | Van Den Broeck et al. | |
| 9,665,854 B1 | 5/2017 | Burger et al. | |
| 9,705,999 B1 | 7/2017 | Lewis et al. | |
| 9,760,871 B1 | 9/2017 | Pourfallah et al. | |
| 9,779,436 B2 | 10/2017 | Bui | |
| 9,830,606 B2 | 11/2017 | Boncimino | |
| 9,846,872 B2 | 12/2017 | Hogg et al. | |
| 9,876,803 B2 | 1/2018 | Miu et al. | |
| 9,892,386 B2 * | 2/2018 | Liberty | G06Q 20/322 |
| 9,922,381 B2 | 3/2018 | Isaacson et al. | |
| 9,990,621 B1 | 6/2018 | Ng et al. | |
| 10,055,740 B2 | 8/2018 | Hanson et al. | |
| 10,062,072 B2 | 8/2018 | Davis et al. | |
| 10,062,073 B2 | 8/2018 | Baldie | |
| 10,068,295 B1 | 9/2018 | Allen | |
| 10,073,953 B2 | 9/2018 | Xing | |
| 10,083,427 B2 | 9/2018 | Cummins et al. | |
| 10,089,617 B2 | 10/2018 | Royyuru et al. | |
| 10,121,129 B2 | 11/2018 | Kalgi | |
| 10,121,133 B2 | 11/2018 | Nelms et al. | |
| 10,127,528 B2 | 11/2018 | Solis | |
| 10,127,549 B2 | 11/2018 | Keresman et al. | |
| 10,148,659 B2 | 12/2018 | Nandakumar | |
| 10,157,375 B2 | 12/2018 | Balasubramanian et al. | |
| 10,163,086 B2 | 12/2018 | Keresman et al. | |
| 10,181,119 B2 | 1/2019 | Cyr et al. | |
| 10,181,162 B2 | 1/2019 | Drury et al. | |
| 10,185,954 B2 | 1/2019 | Mizhen et al. | |
| 10,210,345 B2 | 2/2019 | Beye et al. | |
| 10,210,514 B2 | 2/2019 | Musser et al. | |
| 10,217,102 B2 | 2/2019 | Pitroda et al. | |
| 10,354,240 B2 | 7/2019 | Purves et al. | |
| 10,362,010 B2 | 7/2019 | Sharp et al. | |
| 10,467,689 B2 | 11/2019 | Chen | |
| 10,510,082 B1 | 12/2019 | Zimmerman et al. | |
| 10,621,658 B1 | 4/2020 | Sahni et al. | |
| 10,708,054 B2 | 7/2020 | Donaldson et al. | |
| 11,044,092 B1 | 6/2021 | Freeling et al. | |
| 11,044,246 B1 | 6/2021 | Freeling et al. | |
| 11,050,565 B1 | 6/2021 | Freeling et al. | |
| 11,063,926 B1 | 7/2021 | Narayanan et al. | |
| 11,354,673 B1 | 6/2022 | Brock | |
| 11,429,971 B1 | 8/2022 | Ouellette et al. | |
| 2002/0181710 A1 | 12/2002 | Adam et al. | |
| 2004/0177047 A1 | 9/2004 | Graves et al. | |
| 2005/0262026 A1 | 11/2005 | Watkins | |
| 2006/0020783 A1 | 1/2006 | Fisher | |
| 2006/0059569 A1 | 3/2006 | Dasgupta et al. | |
| 2006/0129896 A1 | 6/2006 | Rohn | |
| 2006/0277128 A1 | 12/2006 | Anandarao et al. | |
| 2007/0271149 A1 | 11/2007 | Siegel et al. | |
| 2007/0288377 A1 | 12/2007 | Shaked | |
| 2008/0052183 A1 | 2/2008 | Hobson et al. | |
| 2008/0086417 A1 | 4/2008 | Bykov et al. | |
| 2008/0120235 A1 | 5/2008 | Chu | |
| 2008/0167944 A1 | 7/2008 | Keithley et al. | |
| 2008/0183593 A1 | 7/2008 | Dierks | |
| 2008/0288405 A1 | 11/2008 | John | |
| 2008/0301022 A1 | 12/2008 | Patel et al. | |
| 2009/0043667 A1 | 2/2009 | Deyoe et al. | |
| 2009/0076934 A1 | 3/2009 | Shahbazi et al. | |
| 2009/0089190 A1 | 4/2009 | Girulat, Jr. | |
| 2009/0249448 A1 | 10/2009 | Choi et al. | |
| 2009/0259560 A1 | 10/2009 | Bachenheimer | |
| 2009/0320106 A1 | 12/2009 | Jones et al. | |
| 2010/0094719 A1 | 4/2010 | Sines et al. | |
| 2010/0100454 A1 | 4/2010 | Sines et al. | |
| 2010/0169223 A1 | 7/2010 | Yuan | |
| 2010/0223184 A1 | 9/2010 | Perlman | |
| 2011/0137804 A1 | 6/2011 | Peterson | |
| 2011/0270751 A1 | 11/2011 | Csinger et al. | |
| 2012/0198535 A1 | 8/2012 | Oberheide et al. | |
| 2013/0013512 A1 | 1/2013 | Cloud et al. | |
| 2013/0103578 A1 | 4/2013 | Mallean et al. | |
| 2013/0117832 A1 | 5/2013 | Gandhi et al. | |
| 2013/0179573 A1 | 7/2013 | Takata et al. | |
| 2013/0198066 A1 | 8/2013 | Wall et al. | |
| 2013/0276078 A1 | 10/2013 | Rockwell | |
| 2013/0282588 A1 | 10/2013 | Hruska | |
| 2013/0339231 A1 | 12/2013 | Chaitanya | |
| 2013/0346302 A1 | 12/2013 | Purves et al. | |
| 2014/0012701 A1 | 1/2014 | Wall et al. | |
| 2014/0129435 A1 | 5/2014 | Pardo et al. | |
| 2014/0165156 A1 | 6/2014 | Fushman et al. | |
| 2014/0223578 A1 | 8/2014 | Ross | |
| 2014/0256425 A1 | 9/2014 | Flaherty | |
| 2014/0258046 A1 | 9/2014 | Wendling et al. | |
| 2014/0258136 A1 | 9/2014 | Ellis | |

(56) References Cited

U.S. PATENT DOCUMENTS

| | | | |
|---|---|---|---|
| 2014/0279546 A1* | 9/2014 | Poole | H04B 5/72 |
| | | | 705/44 |
| 2014/0307735 A1 | 10/2014 | Lerner | |
| 2014/0324690 A1 | 10/2014 | Allen et al. | |
| 2014/0359722 A1 | 12/2014 | Schultz et al. | |
| 2015/0019423 A1 | 1/2015 | Dowling et al. | |
| 2015/0026061 A1 | 1/2015 | Siegel et al. | |
| 2015/0039452 A1 | 2/2015 | Barve et al. | |
| 2015/0052005 A1 | 2/2015 | Howe | |
| 2015/0058931 A1 | 2/2015 | Miu et al. | |
| 2015/0074407 A1 | 3/2015 | Palmeri et al. | |
| 2015/0089409 A1 | 3/2015 | Asseily et al. | |
| 2015/0089615 A1 | 3/2015 | Krawczyk et al. | |
| 2015/0121462 A1 | 4/2015 | Courage et al. | |
| 2015/0154588 A1 | 6/2015 | Purves et al. | |
| 2015/0161608 A1 | 6/2015 | Gilbert et al. | |
| 2015/0188900 A1 | 7/2015 | Charbonneau et al. | |
| 2015/0188915 A1 | 7/2015 | Li | |
| 2015/0242834 A1 | 8/2015 | Goldsmith et al. | |
| 2015/0242949 A1 | 8/2015 | Phillips, IV | |
| 2015/0254638 A1 | 9/2015 | Bondesen et al. | |
| 2015/0278811 A1 | 10/2015 | Lalchandani et al. | |
| 2015/0310497 A1 | 10/2015 | Valin et al. | |
| 2015/0363581 A1 | 12/2015 | Ranadive et al. | |
| 2015/0371226 A1 | 12/2015 | Hurley et al. | |
| 2016/0005113 A1 | 1/2016 | Mendez et al. | |
| 2016/0012465 A1 | 1/2016 | Sharp | |
| 2016/0019536 A1* | 1/2016 | Ortiz | G06Q 20/36 |
| | | | 705/67 |
| 2016/0034900 A1 | 2/2016 | Nelsen et al. | |
| 2016/0132877 A1 | 5/2016 | Carrott | |
| 2016/0189145 A1 | 6/2016 | William | |
| 2016/0239840 A1 | 8/2016 | Preibisch | |
| 2016/0267449 A1 | 9/2016 | Forzley | |
| 2017/0004719 A1 | 1/2017 | Laud et al. | |
| 2017/0024716 A1 | 1/2017 | Jiam et al. | |
| 2017/0070500 A1* | 3/2017 | Hockey | H04L 9/3213 |
| 2017/0076274 A1 | 3/2017 | Royyuru et al. | |
| 2017/0116615 A1 | 4/2017 | Burgess et al. | |
| 2017/0126649 A1* | 5/2017 | Votaw | H04L 63/0815 |
| 2017/0180960 A1 | 6/2017 | Drake | |
| 2017/0286281 A1 | 10/2017 | Dahan | |
| 2017/0286958 A1 | 10/2017 | Herman | |
| 2017/0289140 A1 | 10/2017 | Cai et al. | |
| 2017/0289809 A1* | 10/2017 | Smith | H04W 12/068 |
| 2017/0308880 A1 | 10/2017 | Phillips et al. | |
| 2017/0310771 A1 | 10/2017 | Lewis et al. | |
| 2017/0351514 A1 | 12/2017 | Chou et al. | |
| 2017/0372275 A1 | 12/2017 | Sigmund | |
| 2018/0025333 A1 | 1/2018 | Cunningham | |
| 2018/0060965 A1 | 3/2018 | Kumar | |
| 2018/0068312 A1 | 3/2018 | Kim et al. | |
| 2018/0121896 A1 | 5/2018 | Potadar | |
| 2018/0130051 A1 | 5/2018 | Matthews et al. | |
| 2018/0139109 A1 | 5/2018 | Zuerner | |
| 2018/0150823 A1 | 5/2018 | Omojola et al. | |
| 2018/0150826 A1 | 5/2018 | Schwartz et al. | |
| 2018/0165659 A1 | 6/2018 | Raouda El-Balah | |
| 2018/0189777 A1 | 7/2018 | Grassadonia et al. | |
| 2018/0189778 A1 | 7/2018 | Grassadonia et al. | |
| 2018/0198845 A1 | 7/2018 | Kulp et al. | |
| 2018/0225789 A1 | 8/2018 | Cook | |
| 2018/0240095 A1 | 8/2018 | Buckley et al. | |
| 2018/0247654 A1 | 8/2018 | Bhaya et al. | |
| 2018/0253727 A1 | 9/2018 | Ortiz et al. | |
| 2018/0267847 A1* | 9/2018 | Smith | G06F 16/9577 |
| 2018/0276053 A1* | 9/2018 | Kesavan | G06F 9/541 |
| 2018/0315024 A1 | 11/2018 | Rauch et al. | |
| 2018/0349891 A1 | 12/2018 | Putre et al. | |
| 2019/0005467 A1 | 1/2019 | Varagani et al. | |
| 2019/0012646 A1 | 1/2019 | Seidl et al. | |
| 2019/0034393 A1 | 1/2019 | Rose | |
| 2019/0043138 A1 | 2/2019 | Blake et al. | |
| 2019/0050845 A1* | 2/2019 | Deshmukh | G06Q 20/326 |
| 2019/0058707 A1 | 2/2019 | Chung et al. | |
| 2019/0066090 A1 | 2/2019 | Mei et al. | |
| 2019/0087809 A1 | 3/2019 | Bloy et al. | |
| 2019/0087894 A1 | 3/2019 | Bloy et al. | |
| 2019/0096005 A1* | 3/2019 | Drury | G06Q 20/108 |
| 2019/0130750 A1 | 5/2019 | Cole et al. | |
| 2019/0205851 A1 | 7/2019 | Sinha et al. | |
| 2019/0244263 A1 | 8/2019 | Nelson et al. | |
| 2019/0281051 A1* | 9/2019 | Burmester | H04L 63/0861 |
| 2019/0303910 A1 | 10/2019 | Asbe et al. | |
| 2019/0312746 A1 | 10/2019 | Myers et al. | |
| 2019/0318122 A1 | 10/2019 | Hockey et al. | |
| 2020/0053061 A1 | 2/2020 | Cambou | |
| 2020/0076813 A1 | 3/2020 | Felice-Steele et al. | |
| 2020/0092108 A1 | 3/2020 | Lyu | |
| 2020/0092272 A1 | 3/2020 | Eisen et al. | |
| 2020/0118205 A1 | 4/2020 | Bloy et al. | |
| 2020/0366484 A1 | 11/2020 | So | |
| 2021/0224767 A1 | 7/2021 | DeVan et al. | |
| 2022/0277306 A1 | 9/2022 | Levitt et al. | |

OTHER PUBLICATIONS

Faravelon, A et al., "Privacy conscious web apps composition," 2014 IEEE Eighth International Conference on Research Challenges in Information Science (RCIS), Marrakech, Morocco, 2014, pp. 1-12, doi: 10.1109/RCIS.2014.686 (Year: 2014).*

Bonneau, Joseph and Soren Preibusch. "The Password Thicket: Technical and Market Failures in Human Authentication on the Web." The Ninth Workshop on the Economics of Information Security. Weis. 2010. (Year: 2010).

Subhashree Samal and Swarna Prabha Jena, "Research on the Development of a New Shop Application Using Android," Mar. 2014, International Journal of Advance Computer Research, vol. 4, No. 1 Issue Mar. 14, 2014, pp. 236-241 (Year: 2014).

Zachariadis, M., et al. The API economy and digital transformation in financial services: The case of open banking. Swift Institute Working Paper No. 2016-001. Jun. 15, 2017. (Year: 2017).

Byambajav, Dolgorsuren; "Secure NFC enabled mobile phone payments using elliptic curve cryptography"; California State University, Aug. 2011. (Year: 2011).

Multibiometric Techniques and standards Activities, Rick Lazarick (Year: 2005.

Using Haptic Interfaces for User Verification in Virtual Environments Orozco (Year: 2008).

V. Toubiana, V. Verdot, G. Burnside and E. Joubert, "R2M: A Reputation Model for Mashups," 2010 7th IEEE Consumer Communications and Networking Conference, 2010, pp. 1-6, doi: 10.1109/CCNC.2010.5421609. (Year: 2010).

Wells Fargo Bank NA Granted Patent for Identity Verification Services with Identity Score Through External Entities Via Application Programming Interface Global IP News. Banking Patent News [New Delhi] Apr. 14, 2020. (Year: 2020).

Authentication and Access to Financial Institution Services and System, Aug. 11, 2021, Federal Financial Institution Examination Council. (Year: 2021).

Wells Fargo Bank NA Granted Patent for Identity Verification Services with Identity Score Through External Entities Via Application Programming Interface, Apr. 14, 2020, Global IP News. Banking Patent News, New Delhi. (Year: 2020).

Tiwari, Ayu • Sanyal, Sudip • Abraham, Ajith • Knapskog, Svein Johan• Sanyal, Sugata, A Mul ti-Factor Security Protocol for Wireless Payment-Secure Web Authentication Using Mobile Devices, Nov. 13, 2011, p. 4 ( Year: 2011) (Year: 2011).

Subhashree Samal/Swarna Prabha Jena, Research on the Development of a New Shop Application Using Android, Mar. 2012, Internal Journal of Advanced Computer Research, vol. 4, No. 1 Issue Mar. 14, 2014, pp. 236-241 (Year: 2014).

* cited by examiner

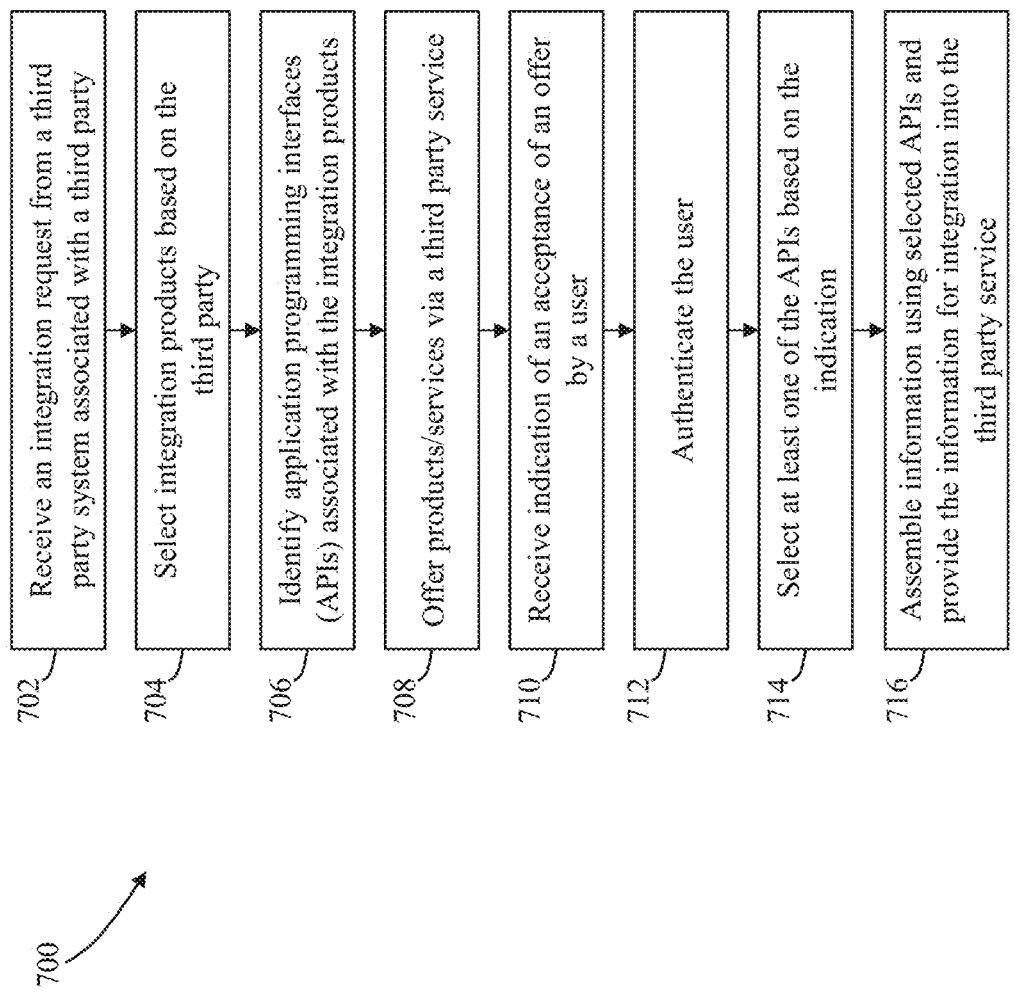

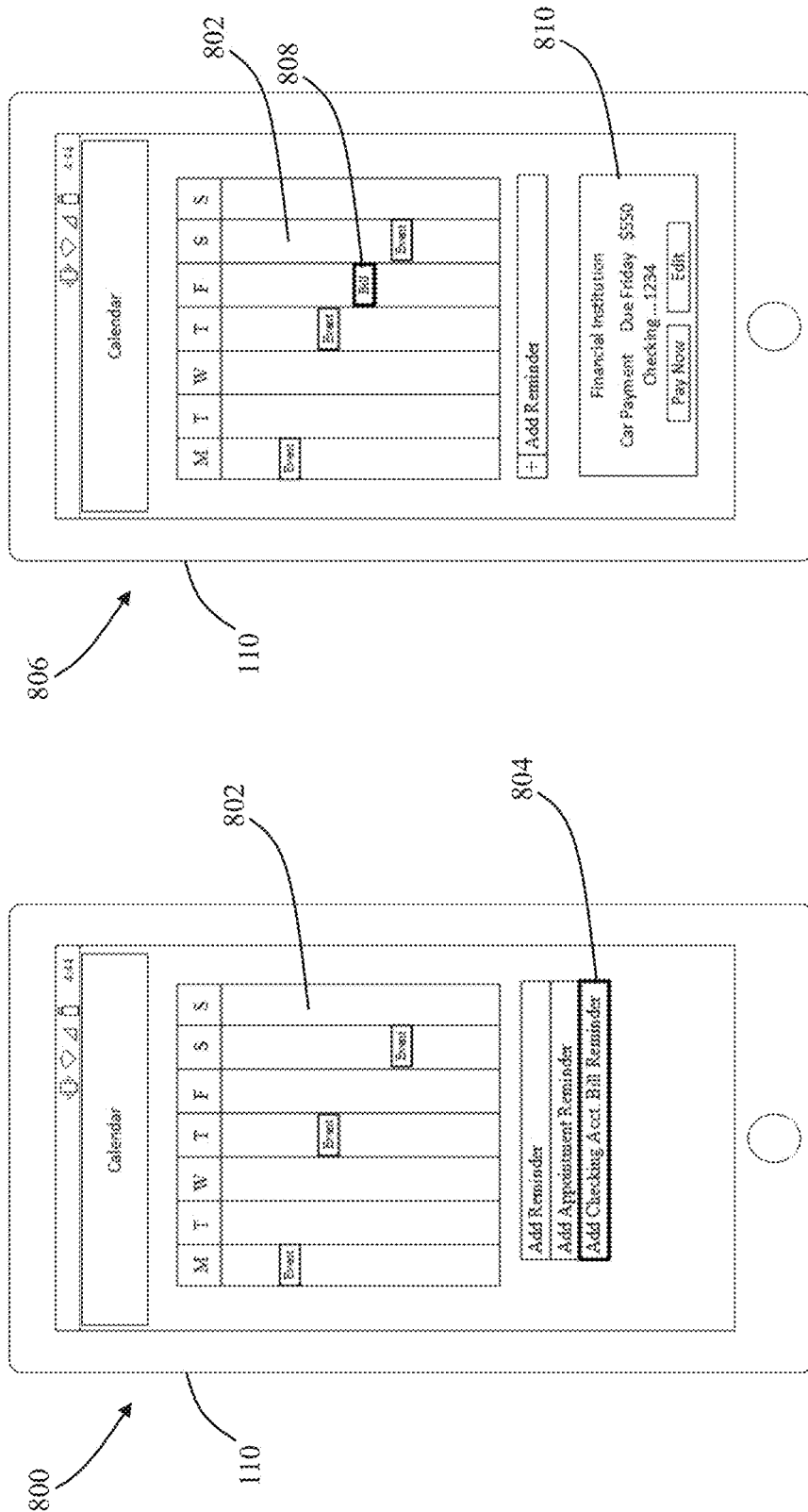

SYSTEMS AND METHODS FOR MULTI-PLATFORM PRODUCT INTEGRATION

CROSS-REFERENCE TO RELATED PATENT APPLICATIONS

This application is a divisional of U.S. patent application Ser. No. 16/215,548, entitled "Systems and Methods for Multi-Platform Product Integration," filed Dec. 10, 2018, which claims priority to and the benefit of U.S. Provisional Patent Application No. 62/611,288, entitled "Systems and Methods for Multi-Platform Product Integration," filed Dec. 28, 2017, all of which are incorporated herein by reference in their entireties.

TECHNICAL FIELD

The present disclosure relates to systems and methods for multi-platform service integration. More particularly, the present disclosure is directed to a client application including a plurality of functionalities that may also be accessed via external applications.

BACKGROUND

Today, purchases are accomplished in a variety of ways from conventional cash or currency to now electronic-based transactions. Certain forms of such electronic-based transactions may be more beneficial than others depending on the circumstances of a user. For example, when with another individual, the user may wish to make a person-to-person payment to that individual. When with a merchant, the user may wish to conduct a mobile wallet transaction. Thus, the user's preferences change based on the circumstances.

SUMMARY

One embodiment of the invention relates to a system that includes a network circuit configured to communicate data over a network, an accounts database configured to store information pertaining to accounts associated with a plurality of customers, and a plurality of application programming interfaces (APIs). The system also includes an integration circuit configured to receive a plurality of indications from different third parties of third party preferences to integrate different ones of the functionalities into different third party services. The integration circuit is further configured to select different subsets of the plurality of APIs for the different third parties based on functionalities identified via the indications. The integration circuit is further configured to update access permissions associated with the different subsets of the plurality of APIs to facilitate sharing of information associated with the functionalities with the third party systems. The integration circuit is further configured to provide, via a first selected subset of the plurality of APIs, information associated with a first functionality to an external device to facilitate access to the first functionality via a first third party service.

Another embodiment relates to a method. The method includes receiving, by a system associated with a financial institution, a plurality of indications from different third parties of third party preferences to integrate different products offered by the financial institution into different third party services. The method also includes selecting, by the system, different subsets of a plurality application programming interfaces (APIs) for the different third parties based on the products identified via the indications. The method also includes updating, by the system, access permissions associated with the different subsets of the plurality of APIs to facilitate sharing of information associated with the functionalities with the third party systems. The method also includes providing, by the system, via a first selected subset of the plurality of APIs, information associated with a first product to an external device to facilitate access to the first product via a first third party service.

Another embodiment relates to a mobile device. The mobile device includes a network circuit structured to communicate data to and from a system associated with a financial institution, an input/output device structured to exchange data with a user; a processor, and a memory configured to store program instructions executable by the processor. The instructions include a financial institution client application configured to cause the processor to present, via the input/output device, the user with a multi-function graphical user interface, the multi-function graphical user interface including a mobile wallet input configured to receive a user input to engage in a mobile wallet transaction and a plurality of additional inputs configured to receive user inputs access a plurality of functionalities. The instructions also include a third party client application that is separate from the financial institution client application. The third party client application includes a set of instructions configured to provide the user with access to one of the plurality of functionalities of the financial institution client application. The set of instructions cause the processor to receive a user input to access the one of the plurality of functionalities via the third party client application, transmit, by the network circuit, an application programming interface (API) access request to an external system in response to receiving the user input, the API access request identifying the one of the plurality of functionalities, and receive, by the network circuit, information relating to the functionality from the system to enable access to the functionality via the third party client application.

BRIEF DESCRIPTION OF THE DRAWINGS

FIG. 7 is a flow diagram of a method of enabling access to a service via a third party, in accordance with an example embodiment.

FIGS. 8A-8B are example third party graphical user interfaces, according to an example embodiment.

DETAILED DESCRIPTION

Figure 1:
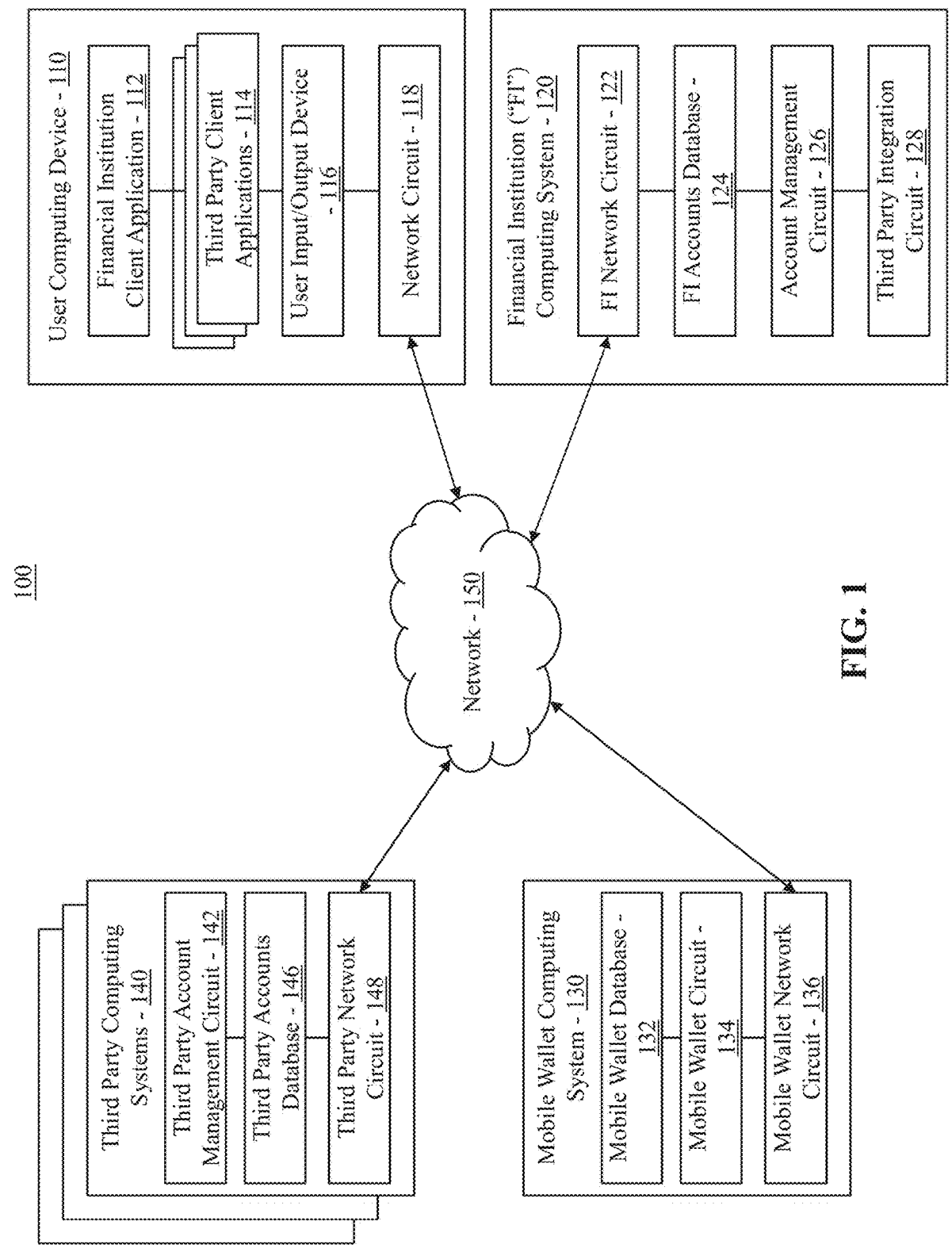
FIG. 1 is a block diagram of a computer-implemented system, according to an example embodiment.

Various embodiments described herein relate to systems and methods for providing users frictionless access to a plurality of different functionalities conventionally only accessible through a diverse array of avenues. In various embodiments, a financial institution computing system provides or otherwise facilitates the operation of a client application on a user device. The client application is configured to enable access to a broad array of financial services with high efficiency. In a first aspect, a presentation tier of the client application is configured to present a multi-feature graphical user interface ("GUI") to the user. The multi-feature GUI enables the user to select from a diverse array of services from within a single screen. For example, in one embodiment, the integration GUI includes an account information portion and a plurality of transactions features (e.g., buttons, icons, links, etc.). The account information portion enables the user to select an account and, for example, view a balance associated with the account. The payment features enable the user to conduct a plurality of types of transactions (e.g., bill payments, person-to-person ("P2P") payments, mobile wallet payments, automated teller machine ("ATM") transactions, transfers to other accounts) via the user device using the account selected via the account selection portion. Technically and beneficially, such an arrangement enables the user to utilize a plurality of different payment combinations (e.g., combinations of accounts and payment types) via a single screen. This eliminates the need for the user to switch back and forth between various applications or screens, thus improving the efficiency of the user device's operation.

In another aspect, the client application is configured to pre-emptively request certain forms of information (herein referred to as "pre-authentication user information" or "PUI") pertaining to financial services prior to requiring the user to authenticate herself. In various embodiments, the user may set preferences identifying PUI to render visible via the client application. In an example, the user may designate balance information pertaining to a checking account as PUI. As a result, the user is able to view the balance of the checking account on the integration GUI prior to authentication. In various other examples, users may designate various other forms of information as PUI (e.g., account activation statuses, payments due, pending transactions, transaction histories, etc.). Technically and beneficially, this enables the user to efficiently make decisions regarding payments with the accounts, reducing the operation time of the client application necessary to perform various operations.

In yet another aspect, the financial institution computing system eliminates the need for users to access the client application to access various services accessible therein. In this regard, the financial institution computing system includes a plurality of software integration packages deliverable to a plurality of third party computing systems providing users with additional services. The software integration packages may include multiple components to facilitate or enable various functionalities contained within the client application in applications and/or websites provided via the third party computing systems. For example, a first software integration package may include an applet and an associated application programming interface ("API"). The applet may be transmitted or otherwise stored at one or more third party computing systems such that the applet is exposed (e.g., as an associated widget) in the provision of third party services. The API may be implemented at the financial institution computing system to determine information access permissions for a user via the widget. In an example, via a third party calendar application including a bill payment applet, the user may select, via an associated widget, to provide the third party calendar application with the user's bill payment information. In response, the third party calendar application may update the access permissions at the financial institution computing system via an associated API such that the user's bill payment information is shared with the calendar application. Once this process is completed, the user is able to schedule and make bill payments via the applet, thus providing an efficient platform for the user to access a service from within a third party platform. In various embodiments described herein, the financial institution computing system includes a plurality of such APIs (referred to herein as an "API bank") for facilitating the provisioning of different information to different third parties depending on the functionalities integrated or desired to be integrated into the third party services. For example, the financial institution computing system may selectively enable subsets of APIs to provide customized sets of information to different third parties. This enables third parties to flexibility integrate financial institution services into third party services to create streamlined user experiences. Additionally, by using customized subsets of the API bank for particular third parties, the systems and methods herein facilitate information retrieval and delivery for third parties seeking to integrate financial institution products into third party services. In other words, third parties obtain only information needed to integrate pre-identified (e.g., pre-selected by the third party or selected via the financial institution) financial institution services within third party services. This reduces data processing requirements at both the financial institution computing system and the third party system to enhance efficiency of third party integration.

Referring now to FIG. 1, a block diagram of a computer-implemented system 100 for providing a multi-functional client application is shown, according to an example embodiment. As shown, the system 100 includes a user device 110 associated with a user, a financial institution computing system 120 associated with a financial institution, a mobile wallet computing system 130 associated with a mobile wallet provider, and one or more third party computing systems 140 associated with various third parties. The various systems and devices may be communicatively and operatively coupled through a network 150, which may include one or more of the Internet, cellular network, Wi-Fi, Wi-Max, a proprietary banking network, or any other type of wired or wireless network or a combination of wired and wireless networks. As described herein, the system 100 may be used to provide a multi-functional client application on the user device 110.

Third party computing systems 140 are computing systems associated with various third parties. As used herein with respect to third party computing systems 140, "third parties" refer to entities that provide various electronic (e.g., web or application-based) services. While conventionally these third parties provide their services independent of the financial institution, according to the present disclosure, the system 100 includes various features to facilitate the integration of the services provided via the third party computing systems 140 and those provided by the financial institution. The "services" may include, but are not limited to payment-related services such as online shopping, search engines, product review services, issuer-specific financial rewards, social media accounts, security services, and the like.

Third party computing systems 140 include a third party account management circuit 142, a third party accounts database 146, and a third party network circuit 148 that enables the third party computing system 140 to exchange data, information, values, and the like over the network 150. The third party accounts database 146 is structured to retrievably store user information relating to user relationships with the third party, and may include non-transient data storage mediums (e.g., local disc or flash-based hard drives, local network servers, and the like) or remote data storage facilities (e.g., cloud servers). Third party account database 146 may include information pertaining to user accounts with the third party. The information stored in the third party account database 146 varies depending on the particular service provided by the third party computing system 140.

The third party account management circuit 142 is structured to provide the user with access to the third party computing system 140 to manage one or more of their accounts held by the third party. As will be appreciated, the functionalities performed by the third party account management circuit 142 will vary depending on the nature of the service provided at the third party computing system 140. In some embodiments, the third party account management circuit 142 is configured to provide an application (e.g., a third party client application 114) on various user devices 110. The application may provide users with various displays enabling the users to take advantage of the various functionalities provided by the third party computing systems 140.

In various embodiments, the third party computing system 140 includes various software components such as various software development kits ("SDKs") that facilitate, enable, or otherwise permit the third party to integrate various functionalities provided by the financial institution into services provided via the third party computing system 140. For example, in various embodiments, the financial institution associated with the financial institution computing system 120 provides access to an SDK to facilitate the development of applets providing users with access to functionalities accessible to the user via the financial institution computing system 120. Via the applets, such functionalities may be exposed via the services at the third party computing systems 140 to provide broad access to the financial institution's services. Each applet may be associated with a particular type of functionality (e.g., information) provided via the financial institution, and be associated with an API at the financial institution computing system 120 configured to facilitate the provisioning of the necessary information for accessing the functionality. As described herein, the financial institution computing system 120 includes an API bank (e.g., as a part of the third party integration circuit 128) selectively enabling the third party computing systems 140 to access the information maintained by or otherwise associated with the financial institution via the applets, depending on the needs of the third party.

The mobile wallet computing system 130 is structured to permit, enable, facilitate, manage, process, and otherwise allow mobile wallet transactions. As used herein, the term "mobile wallet transaction" refers to transactions performed via some form of communications between a sales device (e.g., a POS device) and a mobile communications device (e.g., the user computing device 110 or any other form of computing). The mobile wallet computing system 130 may be associated with, owned by, and/or otherwise operated by a mobile wallet provider. In one embodiment, the mobile wallet provider may be a financial institution, such as the financial institution associated with the financial institution computing system 120. In this instance, the mobile wallet computing system 130 may be a part of the financial institution computing system 120. In another embodiment and as shown, the mobile wallet provider may be a third party provider relative to the financial institution that operates the financial institution computing system 120.

In any configuration, the mobile wallet computer system may provide or at least partly provide a mobile wallet circuit 134. As described in more detail herein, the "mobile wallet" is a digital wallet provided on, for example, the user device 110. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities, functions, and features that are described herein in more detail.

In arrangements where the mobile wallet provider is the financial institution associated with the financial institution computing system 120, each of the operations described herein with respect to the mobile wallet computing system 130 may also be described as being performed by the same financial institution. In such arrangements, the financial institution computing system 120 and the mobile wallet computing system 130 may be operated as a single computing system, or as two or more separate computing systems (as shown in FIG. 1) performing the associated functions described herein. As will be appreciated, the level of functionality that resides on the financial institution computing system 120 as opposed to the mobile wallet computing system 130 in these arrangements may vary depending on the implementation.

With the above in mind, the mobile wallet computing system 130 is shown to include a mobile wallet database 132, a mobile wallet circuit 134, and a mobile wallet network circuit 136 enabling the mobile wallet computing system 130 to exchange data over the network 150. The mobile wallet computing system 130 may be configured to exchange data with the user device 110, financial institution computing system 120, and third party computing systems 140 in the implementation of a user mobile wallet.

Mobile wallet database 132 is structured to store information regarding mobile wallet accounts held by various users, such as for a mobile wallet account held by the user of the user device 110. For instance, the mobile wallet database 132 may store various forms of information related to the user and/or an associated mobile device upon registration of one or both for a mobile wallet. The stored mobile wallet account information may include authentication information (e.g., username/password combinations, device authentication tokens, security question answers, etc.), payment card information, transaction histories, account holder identifying information, registered device information, and any other information that may be encountered in the operation of a mobile wallet account or otherwise referenced herein. Such information may include user preferences and other information comprising a user profile. In some arrangements, for example, mobile wallet database 132 also includes a token vault that is maintained by the mobile wallet computing system 130. The token vault may include a lookup table maintaining tokens associated with various user payment vehicles. The tokens stored therein may be generated internally (e.g., at the mobile wallet computing system 130) or by other entities (e.g., a token service provider computing system). For example, in one embodiment, the token vault may include a lookup table including tokens that that have been randomly assigned to a user payment vehicle (e.g., user checking accounts, credit/debit cards, and the like) by the mobile wallet computing system 130. In some arrangements, the mobile wallet computing system 130 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer.

The mobile wallet circuit 134 is structured to provide a mobile wallet on the user device 110. In some embodiments, the mobile wallet circuit 134 is structured to provide a mobile wallet client application on the user device 110. In this regard, the mobile wallet circuit 134 enables registrations of a user for a mobile wallet, presents the user with various user interfaces enabling user to use or manage a mobile wallet, and enables users to perform transactions using the mobile wallet (e.g., as described with respect to the financial institution client application 112 herein).

The financial institution computing system 120 is a computing system at a financial institution that provides and maintains one or more financial accounts (e.g., demand deposit account, credit or debit card account, brokerage account, mortgage account, etc.) on behalf of the user. In some arrangements, the financial institution is an issuer of a payment vehicle held by the user. The payment vehicle may be used as a source payment vehicle for transactions engaged in via the user's mobile wallet. In the context of the present disclosure, the financial institution can include commercial or private banks, credit unions, investment brokerages, mobile wallet providers, and so on, but can also include any commercial entity capable of maintaining payment vehicles on behalf of a user, including retailers, vendors, service providers, and the like. For example, in one embodiment, the financial institution can be a merchant implementing a loyalty card program including a loyalty card. The loyalty card may be provisioned to the user's mobile wallet such that the user may conduct mobile wallet transactions with the loyalty card. In some arrangements, the financial institution is also a mobile wallet provider configured to manage mobile wallet accounts on behalf of its customers (i.e., users), including authenticating mobile wallet transactions involving debits from the users' payment vehicles. For example, the financial institution may also operate the mobile wallet computing system 130 in various embodiments.

The financial institution computing system 120 includes a financial institution network circuit 122 enabling the financial institution computing system 120 to exchange data over the network 150, a financial institution accounts database 124, an account management circuit 126, and a third party integration circuit 128. The financial institution accounts database 124 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The account management circuit 126 is structured to manage the financial accounts of various users, including maintaining and handling transaction processing for the user's one or more financial accounts. In some embodiments, the financial institution client application (herein "client application") 112 is provided by the account management circuit 126. In this regard, the account management circuit 126 is configured to provide information, values, commands, and the like used to render various displays to aid the user in accessing the various functionalities described herein.

For example, in some embodiments, the account management circuit 126 is configured to receive various account management preferences from, for example, the user device 110. Some of such user preferences may include designations of PUI. As described herein, via the client application 112, the user may specify various forms of information that the user wishes to be accessible prior to authentication via the financial institution client application 112. Such information may include various identities of user accounts (e.g., actual account numbers, surrogate account numbers, account names), balances associated with the user accounts, transaction histories associated with the user accounts, and other information.

The financial institution client application 112 may configure the user device 110 to request such information from the financial institution computing system 120 at various points in various data processing flows associated with functionalities provided via the client application 112. For example, as described herein, a multi-feature GUI servicing as a home screen of the client application 112 may include balances of user accounts. As such, upon the user's initiation of the client application 112 on the user device 110, the user device 110 may request balance information from the financial institution computing system 120. In response to the requests, the financial institution computing system 120 may cross-reference the requested information with the user's PUI designations and, if in accordance with the designations, grant the request by transmitting the information to the user device 110. Thus, the account management circuit 126 facilitates the user customizing data accessible via various data processing flows within the client application 112 to facilitate streamlined access to various services.

The third party integration circuit 128 is configured to arbitrate or otherwise manage various information requests received from the third party computing systems 140 to facilitate the integration of the financial institution's services into those provided by third parties. In this regard, the third party integration circuit 128 may include a plurality of APIs (herein referred to as an "API bank") that facilitate the sharing of varying types of information with different third parties. The information shared may depend on that which is necessary to integrate a particular financial institution functionality into a third-party service. For example, if a particular third party (e.g., associated with a third party client application 114) wishes to integrate a mobile wallet provided via the financial institution into the third party client application 114, the third party integration circuit 128 may update access permissions associated with a wallet API to provide the third party with access to a user's wallet information. This may facilitate the third party integrating a wallet applet (e.g., via an associated applet developed through an SDK), into the third-party application, enabling the user to conduct mobile wallet transactions from within a third party client application 114. Other such examples (e.g., for P2P payments, account balance checks, bill payment information, transaction histories, etc.) are also envisioned.

Various other forms of information sharing relationships are possible. For example, the financial institution computing system 120 may enable third parties to offer a mortgage or other financial product from within third party services. In a third party website, for example, an icon may be displayed enabling a user to indicate a preference to apply for a mortgage. To facilitate the application, the third party integration circuit 128 may include a mortgage-API accessible to the third party to request necessary information and approve the user for a mortgage in response to the user selecting the icon. As such, the API bank facilitates numerous forms of information sharing relationships and enables the financial institution to dynamically update access permissions for the third parties in response to third party requests.

The user device 110 is a computing device associated with the user. The user may include one or more individuals, business entities, government entities, and agents. The user device 110 is structured to exchange data over the network 150, execute software applications, access websites, generate graphical user interfaces, and perform other operations described herein. The user device 110 may include any sort of computing device, such as a smartphone, personal computer, a wearable computing device (e.g., eyewear, a watch or bracelet, etc.), a tablet, a portable gaming device, a laptop, and any other form of computing device (e.g., a smart appliance, a smart speaker, etc.).

The user device 110 includes a client application 112, third party client applications 114, a user input/output ("I/O") device 116, and a network circuit 118 enabling the user device 110 to exchange information over the network 150. The user I/O device 116 includes hardware and associated logics configured to enable the user device 110 to exchange information with a user and other devices (e.g., a merchant transaction terminal). An input aspect of the user I/O device 116 allows the user to provide information to the user device 110, and may include, for example, a mechanical keyboard, a touchscreen, a microphone, a camera, a fingerprint scanner, any user input device engageable to the user device 110 via a USB, serial cable, Ethernet cable, and so on. An output aspect of the user I/O device 116 allows the user to receive information from the user device 110, and may include, for example, a digital display, a speaker, illuminating icons, LEDs, and so on. The user I/O device 116 may include systems, components, devices, and apparatuses that serve both input and output functions, allowing the financial institution computing system 120 exchange information with the user device 110. Such systems, components, devices, and apparatuses include, for example, radio frequency transceivers (e.g., RF or NFC-based transceivers) and other short range wireless transceivers (e.g., Bluetooth R, laser-based data transmitters, etc.).

The user device 110 further includes a client application 112. The client application 112 is structured to facilitate and permit conductance of transactions and management of accounts held by the user (e.g., at the financial institution associated with the financial institution computing system 120 and/or other financial institutions). Accordingly, in some arrangements, the client application 112 is communicably coupled via the network circuit 118 over the network 150 to the financial institution computing system 120. In some embodiments, the client application 112 includes a circuit embodied within the user device 110. For example, the client application 112 may include program logic stored in a system memory of the user device 110. In such arrangements, the program logic may configure a processor of the user mobile device to perform at least some of the functions described herein with respect to the client application 112. In some embodiments, the client application 112 is a web-based application (e.g., provided via the financial institution computing system 120). As will be understood, the level of functionality that resides on the user device 110 versus the financial institution computing system 120 will vary depending on the implementation.

In some embodiments, the client application 112 includes or is otherwise associated with a mobile wallet implemented on the user device 110. For example, the client application 112 may include a mobile wallet circuit therein that facilitates communications via the user device 110 to the mobile wallet computing system 130 enabling access to a user mobile wallet. In such embodiments, the client application 112 is structured to permit mobile wallet users to engage in transactions through the initiation of communications with, for example, a merchant point of sale ("POS") device. For example, in some embodiments, the client application 112 includes a payment application facilitating exchange of mobile wallet credentials (e.g., tokenized account information) with the POS device. In this regard, the client application 112 may interface with a near field communications ("NFC") chip controller to exchange the mobile wallet credentials.

It should be understood that the role that the client application 112 takes in payment transactions will depend on the implementation of the mobile wallet. In some arrangements, for example, the mobile wallet is implemented in a secure element framework. In such arrangements, the user device 110 includes a secure element that is separate from the main system memory of the user device 110. The secure element refers to a tamper-resistant platform that hosts various applications and confidential information associated therewith. The secure element may include, but is not limited to, a universal subscriber identity circuit (a SIM card), a trusted execution environment, and/or a secure digital card. In such arrangements, user authentication information (e.g., payment account information, user PINS, and the like) is stored in the secure element. In various arrangements, the secure element of the user device 110 may include a payment application that interfaces with the NFC chip of the user device 110 responsive to receiving a communication (e.g., an application protocol data unit) from the POS device to enable user payment information to be transferred. In such arrangements, no user information is transferred by the client application 112 to the NFC chip. After user payment information is transmitted to the POS device, the client application 112 may query the secure element for transaction data to notify the user of the completed transaction.

In other arrangements, the client application 112 may operate under a host card emulation framework. In such arrangements, user payment information is maintained within the client application 112 or cloud-based environment (e.g., a host emulation service) rather than in the secure element. In this regard, the client application 112 may include a service component (e.g., a payment application) configured to interface with the NFC chip of the user device 110 to communicate user payment tokens to the merchant point of sale device. To ensure security of user information, the client application 112 may include sandboxing functionalities where a unique user ID (UID) is assigned to the client application 112, and where only other applications (e.g., third party client applications 114) including the same UID may share information stored in relation to the client application 112.

In various other arrangements, the user-specific payment information may be stored in a trusted execution environment ("TEE") within a processor the user device 110. The systems and methods disclosed herein may also be used with other modalities currently available for storage and transfer of user payment device via contactless communication mechanisms. In the example shown, the client application 112 operates under an HCE framework. As such, to conduct a mobile wallet transaction utilizing the client application 112, the user device 110 may communicate with the mobile wallet computing system 130 (or other system) to retrieve a token for use in the conductance of a mobile wallet transaction.

In some arrangements, the client application 112 is structured to enable the user to manage a mobile wallet and other accounts held at the financial institution. In this regard, the client application 112 includes a presentation tier configured to control and manage displays or GUIs presented to the user via the client application 112. As described herein, the presentation tier includes access points to a diverse array of functionalities to streamline the user's experience. For example, the presentation tier may be configured to present the user with the multi-feature GUI described with respect to FIG. 3A herein.

In another aspect, the client application 112 includes an authentication sequence that significantly departs from those of existing systems to further streamline the customer's access to various features. For example, in various existing systems, authentication of the user is required prior to the user viewing various forms of information (e.g., account balance information) or performing tasks (e.g., entering a payment amount for a P2P transaction, selecting an account, etc.) to conduct a transaction. This may prevent the user at times from utilizing various functions, as the user may prefer to avoid the authentication if busy.

To cure these deficiencies, the client application 112 is structured to cause the user device 110 to request PUI from, for example, the financial institution computing system 120 in response to various pre-conditions. An example of such a pre-condition may include the user entering the client application 112, which may cause the user device 110 to request PUI used to populate the home-screen of the client application 112. Such information may include, for example, a listing of user accounts and balances associated with the user accounts. Another pre-condition may involve the user indicating a preference to conduct a mobile wallet transaction, which may cause the user device 110 to request a listing of accounts that have been provisioned to the user's mobile wallet (e.g., from the mobile wallet computing system 130). Additional examples are described with respect to FIG. 2.

In some embodiments, the client application 112 includes an interactive chat bot feature enabling the user to dictate data process flows by inputting commands in everyday language. For example, in some embodiments, the client application 112 includes a function-to-keyword lookup table such that a corresponding function of the client application 112 is called in response to the user inputting a command. In one example, the user may provide an input (e.g., by typing a message into a message prompt or providing a voice command) to view a balance of a checking account. In response, via the function-to-keyword lookup table, an appropriate function is called to request balance information of the checking account from the financial institution computing system 120 and present it to the user. Other functionalities (e.g., the mobile wallet, bill payments, card-free ATM, etc.) described herein may be accessed in a similar manner. As such, the client application 112 provides personable access to various features described herein.

Third party client applications 114 are structured to provide the user with access to services offered by various third parties. In some arrangements, the third party client applications 114 are hard coded into the memory of the user device 110. In another embodiment, these applications are web-based interface applications, where the user has to log onto or access the web-based interface before usage, and these applications are supported by a separate computing system comprising one or more servers, processors, network interface circuits, or the like (e.g., third party computing systems 140), that transmit the applications for use to the mobile device.

In various embodiments, the third party applications 114 include elements providing access to products offered by or otherwise associated with the financial institution. For example, some such products may be related to conducting various forms of transactions (e.g., via a mobile wallet, bill payments, etc.) using services provided by the financial institution. Accordingly, the third party applications 114 may include applets exposing various elements enabling the user to access services offered by the financial institution within the third party application 114. Such access may be enabled or otherwise facilitated by various APIs. For example, one API may enable a transfer of user account information to a third party computing system 140 to facilitate the user selecting an account and making a payment within the third party computing system 140 (e.g., via the mobile wallet provided via the mobile wallet computing system 130).

In some embodiments, various other products (e.g., mortgages, lines of credit, other forms of loans) offered by the financial institution may be accessible to the user via third party applications 114. For example, one third party computing system 140 may offer the user a set of products offered by the financial institution. The set of products may be tailored based on needs of the third party. For example, one third party offering a calendar application may offer a bill payment service to the user via an associated third-party client application 114. In response to the user accepting the offer, an API may facilitate the exchange of user bill payment information to the third party computing system 140 to enable the user's bill payments to be presented via a calendar. In another example, a third party assisting users in forming a business may offer an incorporation service to the user, and an API may facilitate the transfer of necessary information (e.g., documentation pertaining to incorporation or taxes) to the third party computing system 140 in response to the user accepting the offered service. Such integration facilitates the seamless provision of services to the user without requiring the user to even open the client application 112.

Figure 2:
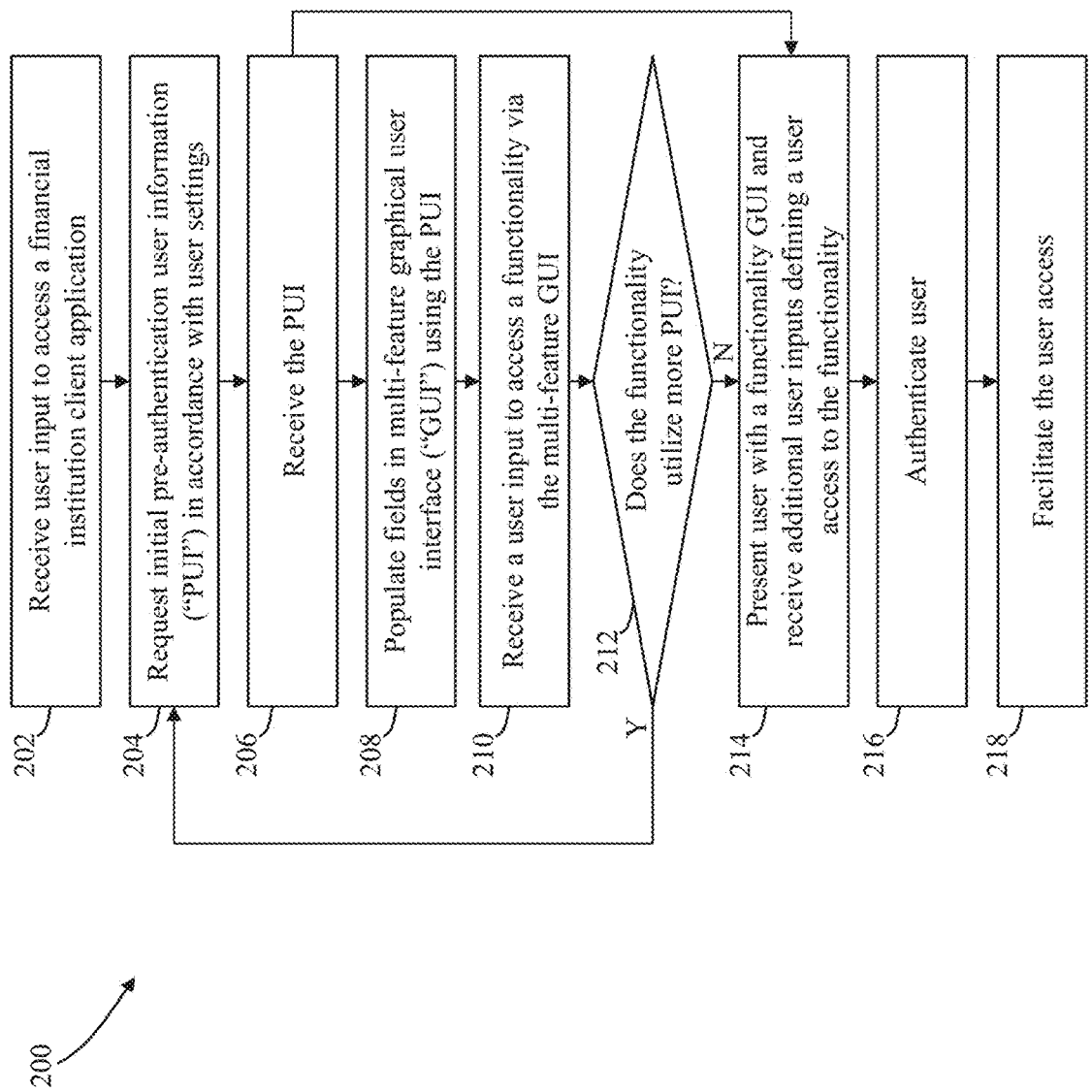
FIG. 2 is a flow diagram of a method of managing a multi-feature graphical user interface including pre-authentication user information, according to an example embodiment.

Referring now to FIG. 2, a flow diagram of a method 200 of managing a multi-feature GUI including pre-authentication user information is shown, according to an example embodiment. Method 200 may be performed by the components described with respect to FIG. 1 such that reference may be made to the components contained therein to aid in the description of the method 200. Method 200 may be performed by, for example, the user device 110 (e.g., via a processor thereof) to update or otherwise manage a multi-feature GUI presented to the user via the client application 112.

At process 202, a user input to access the client application 112 is received. In an example where the user device 110 is a smartphone, the user may select an icon (or other selectable element) via a display device of the smartphone to provide such an input. This input may serve as a command to an operating system of the smartphone causing the smartphone to initialize or otherwise open the client application 112.

At process 204, the user device 110 requests initial PUI in accordance with user settings. In various embodiments, the user (e.g., upon registration or installation of the client application 112) may indicate a preference to have a set of information viewable prior to a time when the client application 112 authenticates the user. In other words, the user may opt to have information viewable pre-authentication that otherwise may only be viewable post-authentication. In some embodiments, the set of information that is viewable prior to authentication is the same for all users of the client application 112 (i.e., the PUI requested is fixed across all users). In alternative embodiments, user may designate certain forms of information as PUI and indicate preferences to maintain other forms of information as only being viewable post-authentication. For example, one user may indicate a preference to have both a listing (e.g., including portions of actual account numbers or account names provided by the user) of the user's accounts at the financial institution as well as the balances of those accounts as PUI. Another user may wish to only an account listing as PUI (i.e., and not the balance information) as PUI.

Accordingly, the client application 112 may cause the user device 110 to formulate information requests in accordance with the user's PUI preferences. In some embodiments, all or a portion of the PUI is requested from the financial institution computing system 120. For example, the user device 110 may transmit an information request for user account information to the financial institution computing system 120 in response to the user input to access the client application 112 received at process 202. In response, the financial institution computing system 120 may cross-reference the requested PUI with user account settings (e.g., stored in the accounts database 124) and, if the requested information is in accordance with the settings, transmit the requested information to the user device 110 at process 206.

At process 208, the user device 110 populates fields (or other information-containing elements) in a multi-feature GUI utilizing the PUI received at process 206. As described herein, the client application 112 includes a presentation tier configured to present the user with an arrangement of manipulatable elements. Via interacting with such manipulatable elements, the user may provide inputs to access or otherwise utilize a plurality of services typically only accessible through separate applications or websites. In some embodiments, such manipulatable elements include elements containing PUI. For example, in one embodiment, the multi-feature GUI includes an account portion containing a listing of user accounts as well as account balance information. Accordingly, the information received at process 206 may be used to formulate elements of the multi-feature GUI presented to the user.

Figures 3A, 3B:
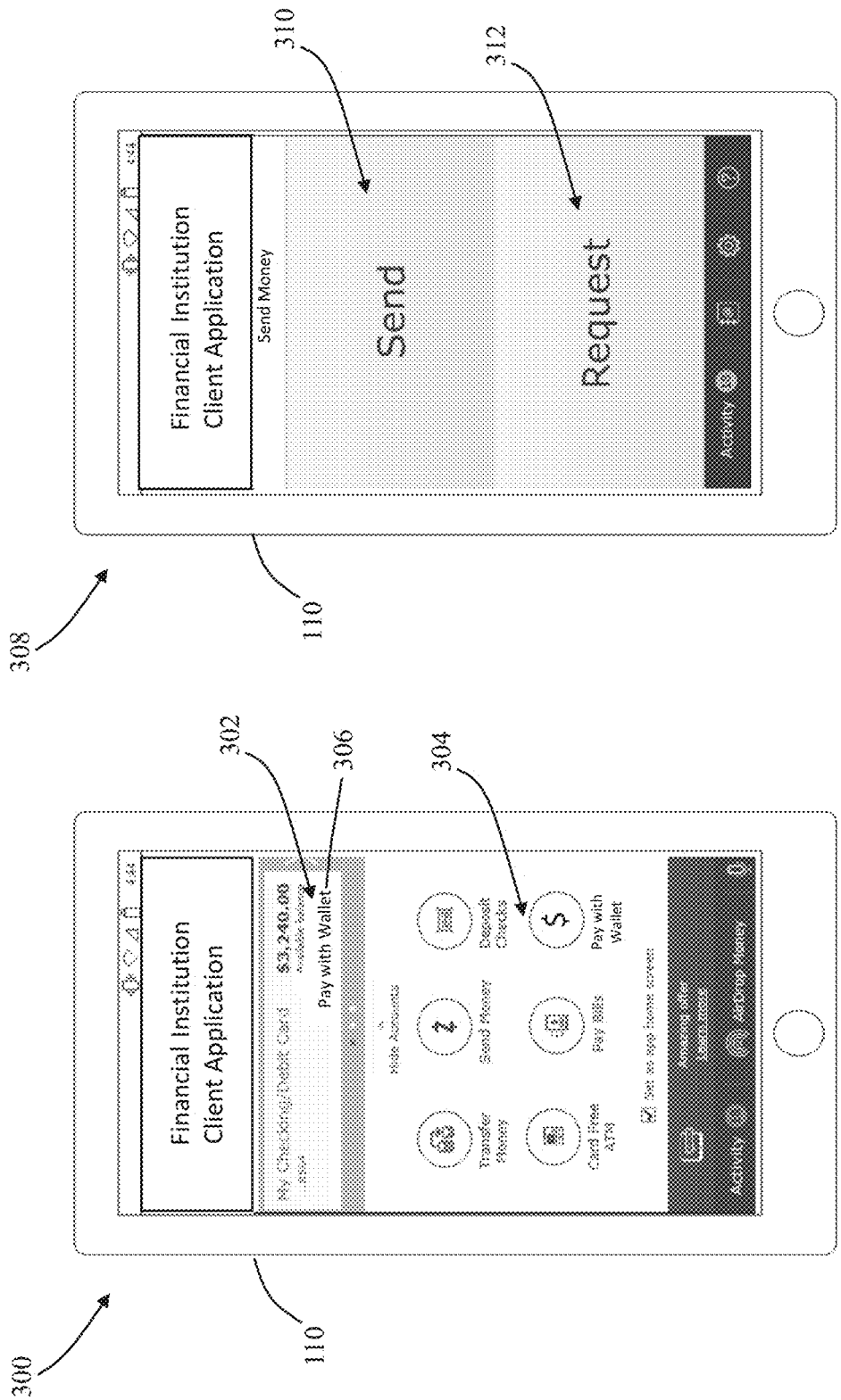
FIGS. 3A-3D are example graphical user interfaces including pre-authentication information, according to an example embodiment.

FIG. 3A shows an example multi-feature GUI 300. In an example embodiment, the multi-feature GUI 300 is a home screen for the client application 112 presented to the user prior to the user being authenticated. In other words, other than providing the input to access the client application 112 at process 202, no other actions of the user are necessary to view of the multi-feature GUI 300. As shown, the multi-feature GUI 300 includes an account information portion 302 and a functionality access portion 304. The account information 302 portion may include a listing of the user's accounts at the financial institution and balance information associated with the listed accounts (e.g., depending on the user's PUI settings). As shown, the account information portion 302 includes a single user account. The user may scroll through the listing of accounts by, for example, pressing a display of the user device 110 and dragging in a predetermined direction (e.g., to the left). The initial account shown in the account information portion 302 may be pre-selected. For example, in one embodiment, the initial account is the user's default account in the user's mobile wallet (e.g., provided by the mobile wallet computing system 130 and/or the financial institution computing system 120).

In the example shown, the account information portion 302 includes a mobile wallet payment button 306. The mobile wallet payment button 306 is configured to receive a user input to engage in a mobile wallet transaction utilizing the account shown in the account information portion 302. As such, upon a user pressing the mobile wallet payment button 306, a payment instruction identifying the selected account may be executed by the user device 110 (e.g., via a processor thereof) to formulate an information packet to be transmitted to, for example, a POS device via NFC upon a communication being received from a POS device. For example, the client application 112 may include an integration package associated with a mobile wallet provided or facilitated via the mobile wallet computing system 130 including a function library represented at least in part by the mobile wallet payment button 306 to enable the user to make payments via the client application 112. In some implementations, the mobile wallet payment button 306 only appears if the user has provisioned the account depicted in the account information portion 302 to the user's mobile wallet. Accordingly, upon configuring the multi-feature GUI 300, the user device 110 may query the mobile wallet computing system 130 to identify which accounts that the user has provisioned to the user's mobile wallet, and only incorporate the mobile wallet payment button 306 into the account information portion 302 for the provisioned accounts.

The functionality access portion 304 includes a plurality of access points (e.g., buttons, hyperlinks, manipulatable elements, etc.) to a broad array of financial services. As used herein, the term "access point" refers to an element configured to receive an input to provide an input to a function being executed by a computing device. In the example shown, the functionality access portion 304 includes a first access point configured to receive a user input to transfer money between the accounts listed in the account information portion 302. Another access point is configured to receive a user input to perform a P2P transfer using a P2P payment system associated with or otherwise accessible via the client application 112. In various embodiments, upon the user interacting with one of the access points in the functionality access portion 304, the user is brought to additional GUIs configured to present and receive additional inputs to provide the depicted service to the user. Examples of such interfaces with respect to the second access point are described with respect to FIGS. 3B-3C herein.

Another access point in the functionality access portion 304 is configured to receive a user preference to deposit a check in the account shown in the account information portion 302 (e.g., by taking a picture of a check or manually entering information of a physical check). Another access point is configured to receive a user input to engage in a card-free ATM transaction. For example, the user may provide such an input when proximate to an ATM to transmit credentials (e.g., a tokenized account number or the like) to the ATM via NFC communication. Upon receipt of the credentials, the user may authenticate herself at the ATM and then utilize functions offered via the ATM. Another access point in the functionality access portion 304 is configured to receive a user input to pay bills. For example, upon providing a bill payment input via the functionality access portion 304, the user may be brought to additional GUIs containing information regarding upcoming bill payments owed by the user (e.g., received by the financial institution computing system 120 as a result of the user linking an account at a service provider with a user account at the financial institution).

Another access point of the functionality access portion 304 is configured to receive a user preference to engage in a mobile wallet transaction (e.g., via the mobile wallet provided by the mobile wallet computing system 130). As such, the multi-feature GUI 300 includes multiple access points to the user's mobile wallet: a first in the account information portion 302 and a second in the functionality access portion 304. The first (the mobile wallet payment button 306) may be configured to receive a particularized user input (i.e., an input to engage in a transaction utilizing the account depicted in the account information portion 302). The second (contained in the functionality access portion 304) may be configured to receive a more general user input. For example, upon the user interacting with the mobile wallet access point within the functionality access portion 304, the user may be brought to an additional GUI listing accounts provisioned to the user's mobile wallet and enable the user to manage the mobile wallet. This way, the user is provided with efficient access to different aspect's or features of the mobile wallet.

In some embodiments, the user device 110 is configured to dynamically update the multi-feature GUI 300 based on the use of the functionalities accessible therefrom. For example, if the user does not interact with an interaction point contained in the functionality access portion 304 within a predetermined period, the access point may be removed from the multi-feature GUI. This way, only those features that are actually used by the user are shown, thus further enhancing efficiency by de-cluttering the multi-feature GUI 300.

Referring back to FIG. 2, a user input to access a functionality via the multi-feature GUI 300 is received at process 210. For example, the user may press a screen of the user device 110 in a location corresponding to one of the access points in the functionality access portion 304, thereby calling a function associated with the depicted access point. At process 212, the user device 110 determines if the functionality accessed via the input received at process 210 utilizes additional PUI. If so, additional PUI is requested based on the requested functionality and processes 204 and 206 are substantially repeated to receive PUI used to populate additional user interfaces associated with the accessed functionality.

Once all information for the accessed functionality is obtained, the user is presented with a functionality GUI and additional user inputs are received at process 214. For example, based on the input received at process 210, the presentation tier of the client application 112 may present the user with an additional GUI containing features associated with the accessed functionality.

FIG. 3B shows an example functionality GUI 308. In an example embodiment, the functionality GUI 308 is presented to the user upon the user interacting with an access point depicting a P2P payment system associated with or otherwise affiliated with the financial institution. As shown, the functionality GUI 308 includes a send button 310 and a request button 312 enabling the user to send or request funds via the P2P payment system. In an example, the user is presented with an additional functionality GUI upon the user pressing either the send button 310 or the request button 312. The additional functionality GUI may include a list of contacts of the user (e.g., obtained from a user phone director or social media network) enabling the user to select an intended recipient or payee for a payment.

Figures 3C, 3D:
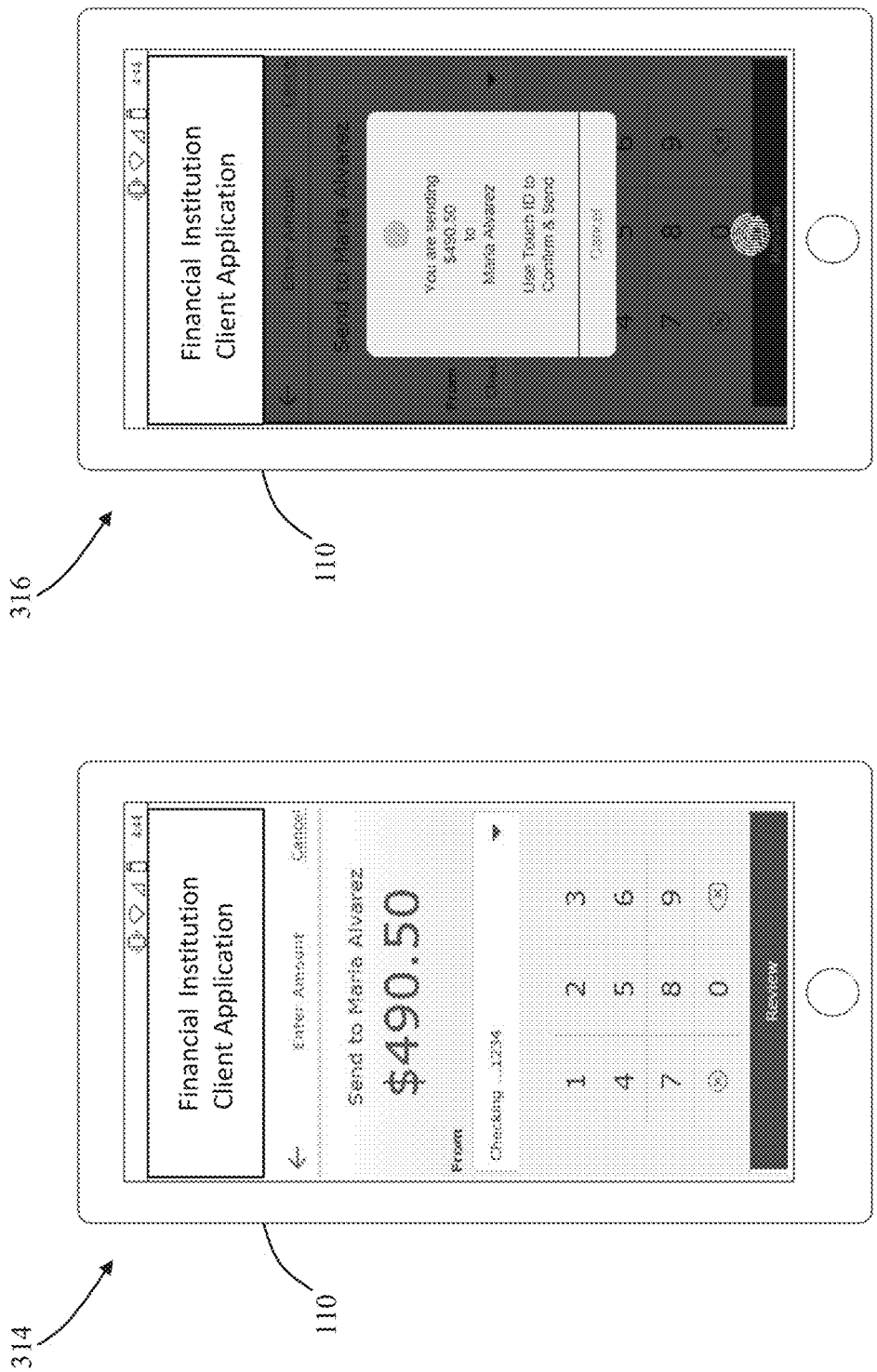

FIG. 3C shows an additional functionality GUI 314, which may be presented to the user upon the user selecting an intended recipient for a payment. As shown, the additional functionality GUI 314 includes a keypad or other input mechanism that enables the user to enter an amount for the payment and an account selection portion. The account selection portion may include a listing of the user's accounts at the financial institution, thus enabling a user to specify an account from which funds are to be transferred to the identified recipient. It should be noted that the user has not yet been authenticated by the client application 112 prior to viewing the additional functionality GUI 314. As such, any information contained on any of the GUIs presented to the user (e.g., the account listings, the contact list, etc.) is PUI. Accordingly, as the user advances through the GUIs presented to define parameters of the P2P payment, the user device 110 may request and receive PUI (e.g., from the financial institution computing system 120 or third party computing system 140 providing the P2P system) to populate such interfaces.

Referring back to FIG. 2, after the additional user inputs are received, the user is authenticated at 216. For example, client application credentials (e.g., a login information) may be collected from the user from an authentication GUI. FIG. 3D shows an example authentication GUI 316 instructing the user to place a finger on a fingerprint scanner of the user device 110 to provide the client application credentials. In alternative embodiments, other forms of credentials (e.g., a username and password) are used. The received credentials may be compared with verified credentials (e.g., stored in a memory of the user device 110 or at the financial institution computing system 120) to authenticate the user. In some embodiments, the process used to authenticate the user depends on the input received at process 210. In other words, the particular functionality accessed may require different authentication processes. For example, in certain embodiments, the user is authenticated via a user-input personal identification number (PIN) that is compared to a stored PIN for a first set of functionalities (e.g., balance viewing, settings management, etc.). In this example, the user may be authenticated by both a fingerprint and a PIN for a second set of functionalities (e.g., a mobile wallet transaction, a P2P transfer, etc.). In certain embodiments, the user can designate a level of authentication required to finalize a user's access to a particular functionality (e.g., via a registration process or a settings page presented via the client application 112). For example, the user may select a set of authentication parameters required to access each functionality accessible via the client application 112.

At process 218, the user access to the functionality is facilitated. For example, upon the user being authenticated, the information received from functionality GUIs presented to the user pre or post-authentication may be transmitted to an external computing system. For example, information regarding a P2P payment may be provided to the P2P payment system to facilitate the processing of the P2P payment. In another example, a payment application may be enabled to transmit credentials associated with a selected account to facilitate the user engaging in a mobile wallet transaction. By facilitating the presentation of the PUI to the user, the user is able to efficiently discern whether they actually desire to access the functionality. For example, if the user determines that an account balance is too low prior to engaging in a transaction (e.g., via the P2P system or the mobile wallet), the user may end the method 200 to avoid the hassle of authentication.

Figure 4:
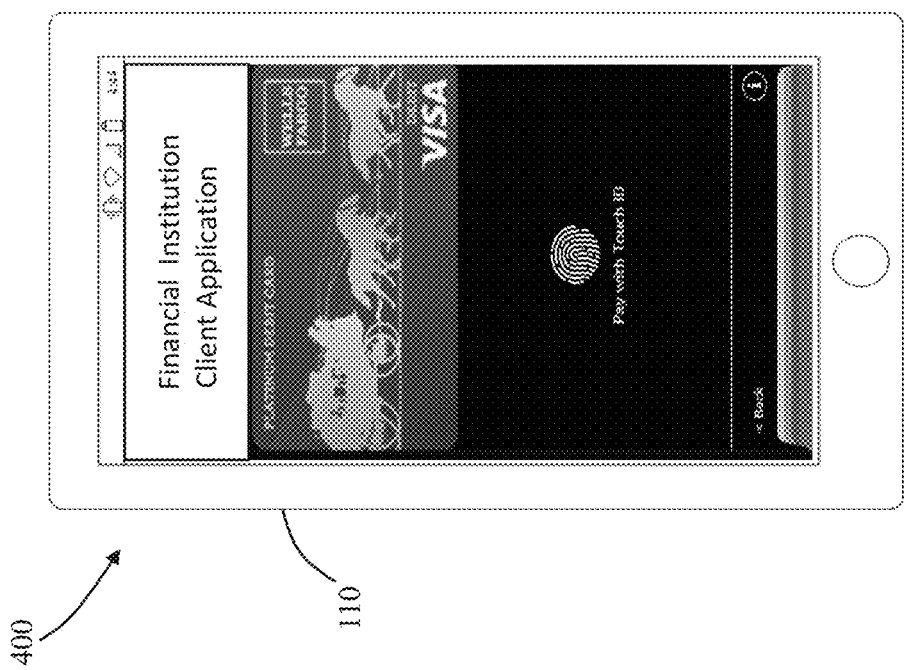
FIG. 4 is an example authentication graphical user interface, according to an example embodiment.

FIG. 4 shows another example authentication GUI 400 that may be presented to the user after the user, for example, provides an input to engage in a mobile wallet transaction via the functionality access portion 304 of the multi-feature GUI 300 described with respect to FIG. 3A. As shown, the authentication GUI 400 includes a depiction of a selected card or account and an account selection portion enabling the user to update the selected account to utilize in a forthcoming mobile wallet transaction prior to providing authentication credentials. Thus, the user is provided with maximum flexibility regarding the transaction prior to authentication taking place.

Figure 5:
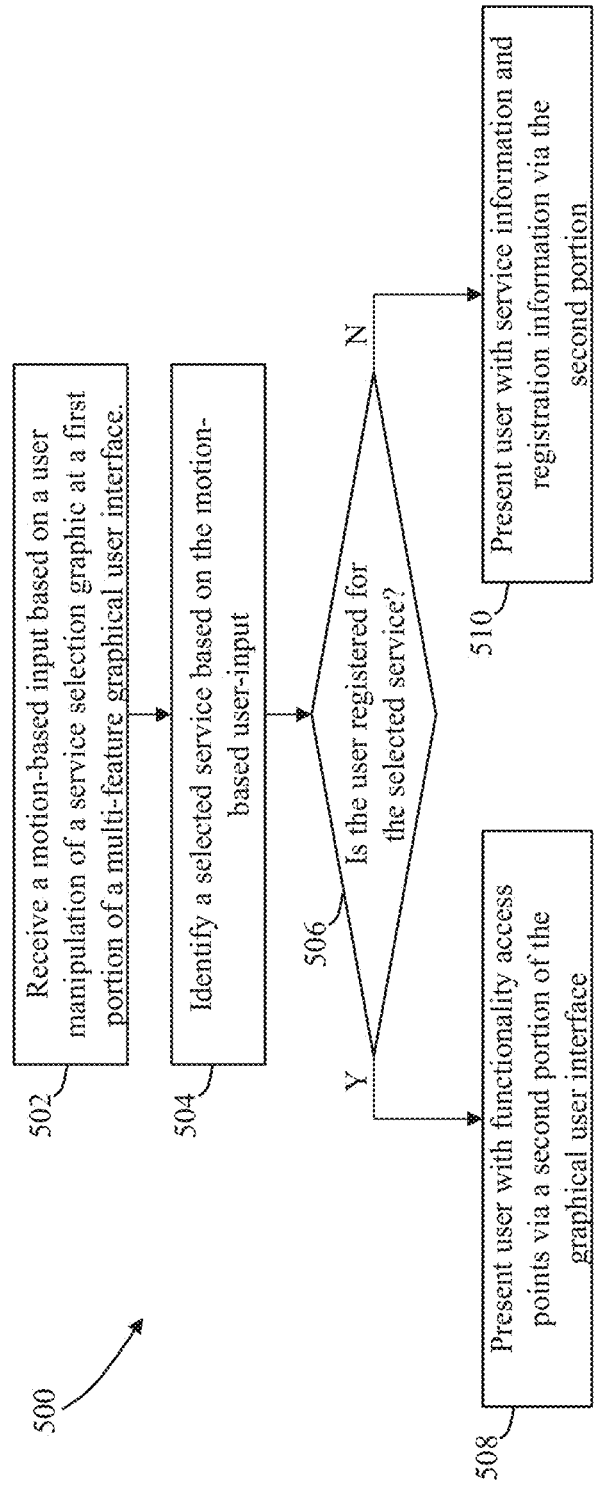
FIG. 5 is a flow diagram of a method of managing a multi-feature graphical user interface, according to an example embodiment.

Referring now to FIG. 5, a flow diagram of a method 500 of managing an alternative multi-feature GUI is shown, according to an example embodiment. For example, in some embodiments, the multi-feature GUI presented to the user via the client application 112 differs in from the multi-feature GUI 300 described herein with respect to FIG. 3A. The user device 110 may execute the method 500 to manage or otherwise update the alternative multi-feature GUI.

Figures 6A, 6B:
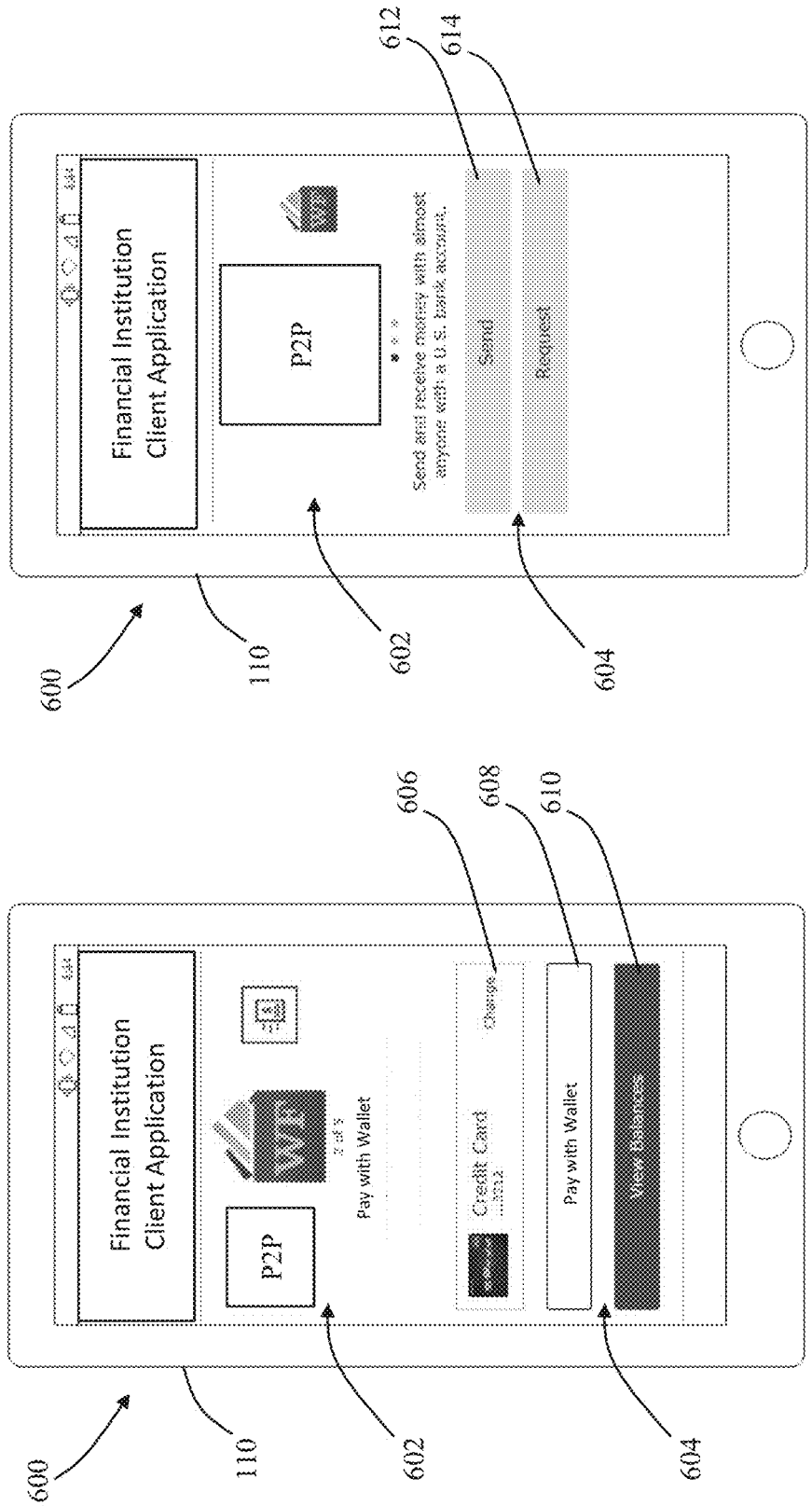
FIGS. 6A-6B are example graphical user interfaces presented to the user during performance of the method described in FIG. 5, according to an example embodiment.

At process 502 a motion-based user input based on a user manipulation of a service selection graphic at a first portion of a multi-feature GUI is received. For example, a user may scroll through a series of services accessible via the client application 112 to select one of the services. FIG. 6A shows an example multi-feature GUI 600 presented via the presentation tier of the client application 112. The method 500 may be executed to update the multi-feature GUI 600. As shown, the multi-feature GUI 600 includes a functionality carousel 602 and a functionality access portion 604. The functionality carousel 602 includes a plurality of depictions of various services accessible via the client application 112. The services depicted may correspond to those described with respect to the functionality access portion 304 of the multi-feature user interface 300 described with respect to FIG. 3A. In some embodiments, the functionality carousel 602 also includes depictions of user accounts. In some embodiments, the order in which the services appear in the functionality carousel 602 is customizable by the user. Alternatively or additionally, the user device 110 may update the order in which services appear based on the utilization of the services (e.g., services or accounts used most commonly may appear first). The user may select a depicted service by scrolling through the functionality carousel 602 to provide the motion-based user input.

At process 504, the user device 110 identifies a selected service based on the motion-based user input. Referring to FIG. 6A, the identification may be made based on the service depicted at a central location of the functionality carousel 602. At process 506, the user device 110 determines whether the user is registered for the selected service. In some embodiments or situations (e.g., when the selected service does not require registration), process 508 is omitted. For example, if a user selects a depiction of an account of the user via the functionality carousel 602, process 508 may be omitted, and the functionality access portion 604 may automatically update to include information (e.g., balance information, transaction history, etc.) pertaining to the selected account.

If the user is registered for the selected service, the user device 110 updates the functionality access portion 604 to include functionality access points at process 508. FIG. 6A shows an example where the user selects a mobile wallet and the user has already registered for the mobile wallet (e.g., the user has provisioned accounts to a mobile wallet account). As shown in FIG. 6A, the functionality access portion 604 contains an account selection box 606 enabling the user to select one of the accounts to utilize in a mobile wallet transaction, a payment button 608 configured to receive a user input to engage in a mobile wallet transaction, and a balance viewing button 610 enabling the user to view a balance of an account via the account selection box 606.

As will be appreciated, the functionality access portion 604 will differ in appearance depending on the service selected via the functionality carousel 602. For example, FIG. 6B shows an example where a user selects a P2P service via the functionality carousel 602. As shown, the functionality access portion 604 includes send 612 and request 614 buttons similar to those described with respect to FIG. 3B. Other services (e.g., bill payment, wire transfers, card-free ATM) may include different access points to enable the user to set parameters with respect to an access of the selected functionality. As will be appreciated, the access points contained in the functionality access portion 604 may be also include PUI, so, in a manner like that described with respect to FIG. 2, the user device 110 may request PUI from any systems to populate the functionality access portion 604 in response to the user selecting a service via the functionality carousel 602.

If however, the user has not registered for the selected service, the user device 110 presents the user with information regarding the selected service at process 510. For example, the functionality access portion 604 may include information regarding the selected service and a registration button configured to receive a user input to set up an account (if necessary) to utilize the selected service. If the user selects the registration button, the user may be presented with a plurality of additional GUIs to gather any necessary information from the user. In various embodiments, the financial institution may update the services depicted in the functionality carousel 602 through transmitting information updates to the user device 110. Thus, the multi-feature GUI 600 enables the user to efficiently access and gain information regarding a broad array of services.

Referring now to FIG. 7, a flow diagram of a method 700 of enabling access to a service via a third party is shown, according to an example embodiment. Method 700 may be executed by, for example, the third party integration circuit 128 of the financial institution computing system 120 to provide access to a functionality or other service via a third party service.

As described herein, the financial institution computing system 120 includes a library of APIs, the API bank, to facilitate the communication of information relating to an assortment of products or services offered by the financial institution to third parties. For example, the API bank may include a first set of APIs to facilitate the sharing of customer financial information (e.g., account balance information, transaction histories, etc.) with third parties (e.g., to facilitate aggregators providing financial health services to users). Other APIs may relate to payments (e.g., mobile wallet, P2P, etc.). Still other APIs may be configured to provide information relating to other products provided via the financial institution (e.g., lines of credit, mortgages, tax services, etc.). In this regard, the API bank includes a specific API or group of APIs for each product offered by the financial institution that third parties may integrate into various third party client applications 114. The financial institution may render select portions of the API bank accessible to third party computing systems 140 to enable such products or services to be accessed from within a third party website or mobile applications. The financial institution computing system 120 may also include additional software integration components to facilitate such integration with third party services. For example, financial institution may agree to provide a third party with an associated SDK to facilitate the integration of software constructed by the financial institution into an application provided via the third party. Method 700 may be executed to enable such integration to allow a user to access an integrated service.

At process 702, an integration request is received from a third-party computing system 140 associated with a third party. For example, the financial institution and third party may form a partnership to render the financial institution's service's accessible via an application or website of the third party. In accordance with this partnership, the third party (e.g., via an associated third party computing system 140) may request access to software integration components (e.g., an SDK, a pre-developed applet, etc.) stored or otherwise provided via the financial institution computing system 120. In some implementations or situations, the third party may provide the financial institution with such software integration components to enable the financial institution to advertise products and/or services within the third party service. In such embodiments, the financial institution may update the content viewable via the third party services (e.g., to advertise different products and or services via the third party).

Alternatively or additionally, in certain implementations, no agreement or partnership is formed between the financial institution and the third party. For example, the financial institution may implement a registration program (e.g., a web-page, application, or the like) through which third parties may request to integrate financial institution products into their services. The third parties may provide a request to the financial institution computing system 120 by providing an input (e.g., by selecting an "integrate" icon or the like) via the registration program. In the request, the third party may be required to provide various forms of information, such as the third party's primary service to customers (e.g., whether a retail shop, whether an aggregator, whether a content provider, etc.).

At process 704, integration products are selected based on the third party. For example, the partnership between the financial institution and third party may specify products or services that are to be integrated into the third party service. In other embodiments, financial institution personnel select products and services to render accessible via the third party services. The products and services may be selected to streamline or enhance the third party service. In a first example, if the third party service relates to business formation and management (e.g., Pro-Tier™), the financial institution services pertaining to incorporation (e.g., retrieval of the necessary documents), account formation, taxes, and financial data sharing may be selected. Another third party service (e.g., associated with an e-commerce merchant) may seek to integrate a mobile wallet payment functionality enabling the user to access a mobile wallet from within the third party service to make payments. Yet another third party service (e.g., associated with a social media platform) may seek to integrate a P2P payments functionality enabling users to access a P2P payments system from within the third party service. Thus, the set of services selected may be specifically tailored to the third party.

In another example, the financial institution computing system 120 may be configured to automatically select a set of products for the third party based on the information contained in a request received from the registration program. For example, based on a type of service provided via the third party, the financial institution may select an assortment of products to render available via the third party services. To illustrate, if the third party is an e-commerce merchant, the financial institution computing system 120 may select a mobile wallet service facilitating users making mobile wallet payments from within a third party service (e.g., a shopping website or application).

At process 706, one or more APIs associated with the integration products are identified. Once partnerships between the financial institution and various third parties have been formed, the financial institution develops or identifies pre-developed APIs necessary to facilitate the information sharing necessary for the selected integration products. The APIs may be selected to create layers of abstraction to facilitate the third parties developing software packages to integrate the selected integration products into the third party services. For example, the APIs may define the manner with which an associated third party computing system 140 or a user device 110 executing a third party application 114 is to request information from the financial institution computing system 120. For example, information requested via the APIs may identify a selected integration product, thereby enabling the financial institution computing system 120 to provide access to the API in real-time in response to receiving such information requests.

The selected APIs may define a command through which information is to be requested via a third-party services. The command may include an API-identifier that identifies the API at the financial institution computing system 120. Additionally, the command may include a third party identifier portion such that the third party and particular third party service requesting information from the financial institution computing system 120 be included in any information requests. In some embodiments, this data is integrated into a token or a digital certificate issued by the financial institution. The tokens or digital certificate may be encrypted via an encryption key specific to the third party. This way, third party applications may be written such that, when users request to access the integration products via the third party services, properly formatted commands including the encrypted tokens are transmitted by the user device 110 and/or third party computing system 140. The information necessary to formulate the command (e.g., the token, the digital certificate, etc.) may be transmitted to the third party computing system 140 to facilitate the integration of the products into the third party service such that information requests are generated from within the third party service. As such, the financial institution computing system 120 can efficiently determine if the third party has access to the APIs associated with the integration product.

After the APIs are selected based on the selected integration products, access permissions associated with the selected APIs are updated. For example, an API directory may be updated such that commands containing properly-formatted commands (e.g., including a token and/or digital certificate that, when decrypted using an encryption key associated with the third party, matches the assigned token or digital certificate) activate the selected APIs to provide information to the third-party service necessary to integrate the financial institution product into the third-party service.

At process 708, products or services are offered via a third-party service. In some implementations, software components developed by the third party or financial institution are exposed to users within applications accessed via the third party computing system 140. In some embodiments, the exposed software components may comprise applets enabling users to access functionalities provided via the client application 112 described herein. Other software components may be configured to enable the user to register for an account at the financial institution from within the third party service. Other components may contain information and enable users to access other products (e.g., mortgages, lines of credit, etc.) offered by the financial institution. The certain products exposed may be determinable by the financial institution computing system 120. For example, the third party computing system 140 offering the third party service accessed by a user may transmit information regarding the user to the financial institution computing system 120, which may determine a product to expose based on the user information. Alternatively or additionally, such analysis may be performed via the third party computing system 140. Thus, different products of the products selected at process 704 may be exposed to different users based on information regarding the user (e.g., the user's purchasing history at the third party).

FIG. 8A is an example integration GUI interface 800 including an offering of a financial institution product in a third party service. The example shown involves a third party application 114 enabling the user to set up an event calendar. As shown, the integration GUI 800 includes an event portion 802 containing various events (e.g., entered by the user or retrieved from other data sources such as social media websites) associated with the user. As shown, the integration GUI 800 includes a bill payment reminder button 804 configured to receive a user input to provide the third party application 114 with access to the customer's bill payment information. Put differently, via the bill payment reminder button 804, the user is able to access a financial institution service typically only accessible via an application provided via the financial institution (e.g., the client application 112). For example, the third party client application 114 may include an integration package configured to request customer bill payment information via an associated API if the user provides an input via the bill payment reminder button 804. Other third party applications 114 may integrate other financial institution services suitable for integration therein.

Referring back to FIG. 7, an indication of an acceptance of an offer by a user is received at process 710. In the example shown in FIG. 8A, the user may select the bill payment reminder button 804 to provide the input to integrate bill payment information into the event calendar. In other examples, the user may indicate a preference to accept an offering of a financial institution product presented to the user from within the third party service. In response, the user device 110 (or the third-party computing system 140) may communicate the indication of the acceptance to the financial institution computing system 120. The indication of the acceptance may include the command including the encrypted token specified when the APIs were initial selected at process 706.

In various embodiments, the partnership between the financial institution and third party may define information that is to be included in the indication of the acceptance. For example, the financial institution may require that the indication include certain forms of information regarding the user (e.g., name, street address, etc.). The financial institution may also require other forms of information (e.g., the current location of the user obtained via the user device 110, an authentication credential of the user such as a username or password, etc.). Accordingly, upon the user initially providing an input to utilize a product or service offered by the financial institution, additional GUIs may be presented to the user to collect the information specified prior to this information being relayed to the financial institution computing system 120. Alternatively or additionally, such information may be collected from the third-party computing system 140 (e.g., retrieved from the third-party accounts database 146) and provided to the financial institution.

At process 712, the user is authenticated. In various embodiments, such authentication is performed based on the information contained in the indication received at process 710. For example, based on the user's name, the financial institution computing system 120 may retrieve information regarding the user stored at the financial institution (e.g., in the accounts database 124) and cross-reference the retrieved information with information contained in the indication to authenticate the user. In another embodiment, the customer's current location (e.g., contained in the indication) may be cross-referenced with a user address contained in the indication. If there is a mismatch between these locations (e.g., by more than a predetermined mileage threshold), the financial institution computing system 120 may request an alternative form of authentication from the user. For example, in response to the user not being authenticated based information contained in the indication, the financial institution computing system 120 may transmit an authentication request to the third party computing system 140. This may cause the third party computing system 140 to transmit an information packet (e.g., an authentication splash page) to the user device 110 requesting authentication credentials (e.g., mobile banking credentials used to authenticate the user's access to the client application 112) from the user. In some embodiments, if the user is not authenticated, method 700 ends.

At process 714, if the user authenticated, at least one API in the API bank is selected based on the indication. For example, based on the identity of the product or service that the user is seeking to access, the financial institution computing system 120 may select an API to provide necessary information to the third party computing system 140 or user device 110. In some embodiments, APIs are selected based on information regarding the user. For example, different APIs may be selected depending on whether the user has been registered to receive a service directly from the financial institution. For example, if the user selects the bill payment reminder button 804 described with respect to FIG. 8A and has not yet registered to pay her bills via the financial institution, a registration API may be enabled to present bill payment registration interfaces to the customer from within the third party application.

In some embodiments, different APIs may be enabled based on a level of confidence in the user's authentication (or in the security of the third-party computing system 140). For example, based on a confidence rating of the user's authentication (e.g., determined based on a lookup table assigning confidence scores to amounts of verified information regarding the customer obtained), APIs providing variable amounts of customer information may be selected. For a user having a low confidence rating (e.g., if the user provides a correct address, but has a current location not corresponding to the address), the financial institution computing system 120 may select an API that shares less information than possible. In an example, for a low-confidence user indicating a preference to share bill payments information with a third party service may enable an API including only the dates of upcoming bill payments, rather than the amounts. In some embodiments, upon selection of a particular API, a notification is transmitted to the third party computing system 140 such that the customer experience within a third party application 114 may be updated to incorporate the integrated service.

At process 716, information is assembled using the selected APIs and provided to the third party computing system 140 or user device 110 for integration into the third party service. In some embodiments, upon selecting the APIs, the financial institution computing system 120 updates information access permissions associated with a user account in the accounts database 124 to facilitate periodic information sharing via the third party application 114 to integrate a service into the third party application 114. In the example described with respect to FIG. 8A, user bill payment information may be shared upon requests being received via the third party application 114. In another example, user mobile wallet information (e.g., provisioned accounts, tokens, etc.) may also be shared with another third party client application 114 to enable the customer to initiate mobile wallet transactions from within the third party client application 114. For example, the user may make payments for rides received via a driving service application via the user's mobile wallet.

In some situations, the financial institution computing system 120 formulates an information request for the selected APIs based on the information contained in the indication received at process 710. For example, if the selected service is an incorporation assistance service offered by the financial institution, the selected APIs may be used to retrieve versions of the selected documents and provide them to the third party computing system 140 and/or user device 110 for presentation to the user. In some embodiments, where multiple APIs are selected, an aggregator may assemble the information rather than the financial institution computing system 120. For example, if the integration product is a mortgage offered by the financial institution, an aggregator may utilize the selected APIs to assemble tax information, account balance information, credit report information, and the like to aid in determining the user's eligibility for the mortgage.

In some embodiments, transactions are performed after the APIs are used to collect necessary information to integrate the product or service. For example, if the product selected by the customer is to register for an account at the financial institution, additional information may be requested from the user (e.g., source account information such as a picture of a check, an account number, a tokenized account number from a mobile wallet, etc.). The additional information may be used to formulate a transaction request to fund the user's new account.

FIG. 8B shows an example integration GUI 806 having a financial institution service integrated therein. The integration GUI 806 is an extension of the example described with respect to FIG. 8A (e.g., after the user has been authenticated and the bill payment information has been provided to the third party application 114). As shown, the event portion 802 has been updated to incorporate a user bill payment reminder 808. For example, the integration package contained within the third party client application 114 may be configured to construct such reminders from bill payment information received from the financial institution computing system 120. This way, the user is able to efficiently view upcoming bill payments. The integration GUI 806 also includes a payment window 810. In addition to enabling the user to view the bill payment information via the calendar, the integration package of the third party client application 114 may include a payments applet overlaid by the payment window 810. To facilitate such a payments applet, in this example, the financial institution computing system 120 may enable both a bill payment information API as well as a payments API for the third party client application 114 during the method 700. Thus, depending on functionalities desired by the third party, differing amounts of APIs may be enabled.

The API bank described herein facilitates providing customizable levels of integration with respect to various third party services, thus providing third parties with maximal flexibility in terms of the depth of services they wish to incorporate. Additionally, the API bank arrangement enhances flexibility for the financial institution in forming service integration partnerships. Because the financial institution computing system 120 selectively enables differing APIs in real-time, for example, the financial institution is able to update the APIs to, for example, update information sources or the like.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:
1. A mobile device, comprising:
a network circuit structured to communicate data to and from a computing system;
an input/output device structured to exchange data with a user, the input/output device comprising a display device configured to display a graphical user interface (GUI);
a processor; and
a memory configured to store program instructions executable by the processor, wherein the program instructions include:
a financial institution client application configured to cause the processor to:
receive a first user input to provide first authentication information for a first functionality of a plurality of functionalities;
transmit, to the computing system, the first authentication information to retrieve information associated with the first functionality of the plurality of functionalities;
generate a multi-feature GUI to receive a user input for accessing the plurality of functionalities, the multi-feature GUI comprising information associated with the first functionality retrieved from the computing system in response to the transmitted first authentication information; and
present, via the display device, the multi-feature GUI, the multi-feature GUI configured to receive a user input for accessing the plurality of func- tionalities, the plurality of functionalities comprising a mobile wallet transaction functionality; and
a third-party client application configured to cause the processor to:
provide the user with access to the plurality of functionalities;
receive a user input to select access to the first functionality of the plurality of functionalities via the third-party client application;
transmit, to an external system, an application programming interface (API) access request in response to receiving the user input, the API access request identifying the first functionality;
responsive to the API access request, receive, from the external system, an authentication request corresponding to the first functionality;
transmit authentication information corresponding to the first functionality in response to the authentication request;
responsive to the external system authenticating the API access request based on the first authentication information and the authentication information corresponding to the first functionality, receive, from the computing system, information relating to the first functionality to enable access to the first functionality via the third-party client application; and
generate, using the information relating to the first functionality, at least one graphical element implementing the first functionality and embedded in a second graphical user interface of the third-party client application.

2. The mobile device of claim 1, wherein the multi-feature GUI is configured to display the plurality of functionalities on a single interface and receive a user input for accessing the plurality of functionalities.

3. The mobile device of claim 1, wherein the multi-feature GUI includes a functionality selection portion and a functionality access portion, the functionality selection portion configured to receive a user input for selecting at least one functionality of the plurality of functionalities, and wherein the financial institution client application is further configured to cause the processor to update the functionality access portion based on the user input.

4. The mobile device of claim 1, wherein the plurality of functionalities is a first plurality of functionalities, wherein the third-party client application is configured to provide a second plurality of functionalities comprising a third-party functionality, and wherein the first functionality of the first plurality of functionalities is integrated with the third-party functionality such that the first functionality is performed while performing the third-party functionality.

5. The mobile device of claim 1, wherein the first functionality is a person-to-person (P2P) funds transfer functionality.

6. The mobile device of claim 5, wherein funds transferred via the P2P funds transfer functionality are from an account held at a financial institution associated with the financial institution client application.

7. The mobile device of claim 1, wherein the third-party client application enables scheduling of one or more payments via the first functionality.

8. The mobile device of claim 7, wherein the third-party client application is a calendar application.

9. The mobile device of claim 1, wherein the computing system is associated with a financial institution that is associated with the financial institution client application, and the external system is associated with a third-party that is associated with the third-party client application.

10. A method, implemented by a mobile device, comprising:
receiving, by a financial institution client application executing on the mobile device, a first user input to provide first authentication information for a first functionality of a plurality of functionalities;
transmitting, by the financial institution client application, to a second system, the first authentication information to retrieve information associated with the first functionality of the plurality of functionalities;
generating, by the financial institution client application, a multi-feature GUI to receive a user input for accessing the plurality of functionalities, the multi-feature GUI comprising information associated with the first functionality retrieved from a computing system in response to the transmitted first authentication information;
presenting, by the financial institution client application, via a display device of the mobile device, the multi-feature GUI, the multi-feature GUI configured to receive a user input for accessing a first plurality of functionalities, the plurality of functionalities comprising a funds transfer functionality;
providing, by a third-party client application executing on the mobile device, a second plurality of functionalities;
receiving, by the third-party client application, a user input to select access, via the third-party client application, to the first functionality of the first plurality of functionalities;
transmitting, by the third-party client application, to a first system, an application programming interface (API) access request in response to receiving the user input, the API access request identifying the first functionality;
responsive to the API access request, receiving, by the third-party client application, from the first system, an authentication request corresponding to the first functionality;
transmitting, by the third-party client application, authentication information corresponding to the first functionality in response to the authentication request;
responsive to the first system authenticating the API access request based on the first authentication information and the authentication information corresponding to the first functionality, receiving, by the third-party client application, from the second system, information relating to the first functionality to enable access to the first functionality via the third-party client application; and
generating, by the third-party client application, using the information relating to the first functionality, at least one graphical element implementing the first functionality and embedded in a second graphical user interface of the third-party client application.

11. The method of claim 10, wherein the multi-feature GUI is configured to display the plurality of functionalities on a single interface and receive a user input for accessing the plurality of functionalities.

12. The method of claim 10, wherein the multi-feature GUI includes a functionality selection portion and a functionality access portion, the functionality selection portion configured to receive a user input for selecting at least one functionality of the plurality of functionalities, and wherein the financial institution client application is further configured to update the functionality access portion based on the user input.

13. The method of claim 10, wherein the second plurality of functionalities comprises a third-party functionality, and wherein the first functionality of the first plurality of functionalities is integrated with the third-party functionality such that the first functionality is performed while performing the third-party functionality.

14. The method of claim 10, wherein the first functionality is a person-to-person (P2P) funds transfer functionality.

15. The method of claim 10, wherein the third-party client application enables scheduling of one or more payments via the first functionality.

16. The method of claim 10, wherein the first system is associated with a third-party that is associated with the third-party client application, and wherein the first system is associated with a financial institution that is associated with the financial institution client application.

17. A non-transitory computer-readable storage medium comprising instructions executable by a processor of a mobile computing device, the instructions including:
 a financial institution client application configured to cause the processor to:
  receive a first user input to provide first authentication information for a first functionality of a plurality of functionalities;
  transmit, to a computing system, the first authentication information retrieve information associated with the first functionality of the plurality of functionalities;
  generate a multi-feature GUI to receive a user input for accessing the plurality of functionalities, the multi-feature GUI comprising information associated with the first functionality retrieved from the computing system in response to the transmitted first authentication information; and
  present, via a display device of the mobile computing device, the multi-feature GUI configured to receive a user input for accessing the plurality of functionalities, the plurality of functionalities comprising a funds transfer functionality; and
 a third-party client application configured to cause the processor to:
  provide a user with access to the plurality of functionalities;
  receive a user input to select access to the first functionality of the plurality of functionalities via the third-party client application;
  transmit, to an external system, an application programming interface (API) access request in response to receiving the user input, the API access request identifying the first functionality;
  responsive to the API access request, receive, from the external system, an authentication request corresponding to the first functionality;
  transmit authentication information corresponding to the first functionality in response to the authentication request;
  responsive to the external system authenticating the API access request based on the first authentication information and the authentication information corresponding to the first functionality, receive, from the computing system, information relating to the first functionality to enable access to the first functionality via the third-party client application; and
  generate, using the information relating to the first functionality, at least one graphical element implementing the first functionality and embedded in a second graphical user interface of the third-party client application.

18. The non-transitory computer-readable storage medium of claim 17, wherein the plurality of functionalities is a first plurality of functionalities, wherein the third-party client application is configured to provide a second plurality of functionalities comprising a third-party functionality, and wherein the first functionality of the first plurality of functionalities is integrated with the third-party functionality such that the first functionality is performed while performing the third-party functionality.

19. The non-transitory computer-readable storage medium of claim 17, wherein the first functionality is a person-to-person (P2P) funds transfer functionality.

20. The non-transitory computer-readable storage medium of claim 17, wherein the third-party client application enables scheduling of one or more payments via the first functionality.

* * * * *